United States Patent [19]

Fletcher

[11] Patent Number: 4,464,712
[45] Date of Patent: Aug. 7, 1984

[54] SECOND LEVEL CACHE REPLACEMENT METHOD AND APPARATUS

[75] Inventor: Robert P. Fletcher, Poughkeepsie, N.Y.

[73] Assignee: International Business Machines Corporation, Armonk, N.Y.

[21] Appl. No.: 280,759

[22] Filed: Jul. 6, 1981

[51] Int. Cl.$^3$ .......................... G06F 13/08; G06F 9/36
[52] U.S. Cl. .................................................. 364/200
[58] Field of Search ............................... 364/200, 900

[56] References Cited

U.S. PATENT DOCUMENTS

| | | | |
|---|---|---|---|
| 3,806,883 | 4/1974 | Weisbecker | 364/200 |
| 3,845,474 | 10/1974 | Lange et al. | 364/200 |
| 3,866,183 | 2/1975 | Lange | 364/200 |
| 3,938,097 | 2/1976 | Niguette | 364/200 |
| 3,949,368 | 4/1976 | West | 364/200 |
| 3,949,369 | 4/1976 | Churchill, Jr. | 364/200 |
| 4,070,706 | 1/1978 | Scheuneman | 364/200 |
| 4,077,059 | 2/1978 | Cordi et al. | 364/200 |
| 4,168,541 | 9/1979 | Dekarske | 364/200 |
| 4,181,937 | 1/1980 | Hattori et al. | 364/200 |
| 4,195,343 | 3/1980 | Joyce | 364/200 |
| 4,322,795 | 3/1982 | Lange et al. | 364/200 |
| 4,332,010 | 5/1982 | Messina et al. | 364/200 |

Primary Examiner—Gareth D. Shaw
Assistant Examiner—Daniel K. Dorsey
Attorney, Agent, or Firm—Bernard M. Goldman

[57] ABSTRACT

The disclosure controls the replacement selection of entries in a second level (L2) cache directory of a storage hierarchy using replaced and hit addresses of a dynamic look-aside translation buffer (DLAT) at the first level (L1) in the hierarchy which receives CPU storage requests along with the CPU cache and its directory. The DLAT entries address page size blocks in main storage (MS).

The disclosure provides a replacement (R) flag for each entry in the L2 directory, which represents a page size block in the L2 cache. An R bit is selected and turned on by the address of a DLAT replaced page which is caused by a DLAT miss to indicate its associated page is a candidate for replacement in the L2 cache. However, the page may continue to be accessed in the L2 cache until it is actually replaced. An R bit is selected and turned off by a CPU request address causing a DLAT hit and a L1 cache miss to indicate its associated L2 page is not a candidate for replacement.

12 Claims, 18 Drawing Figures

FIG. 4 (RA ACCESS TO DAT TABLES IN MS)

FIG. 8 (SELECT CLASS REGISTER)
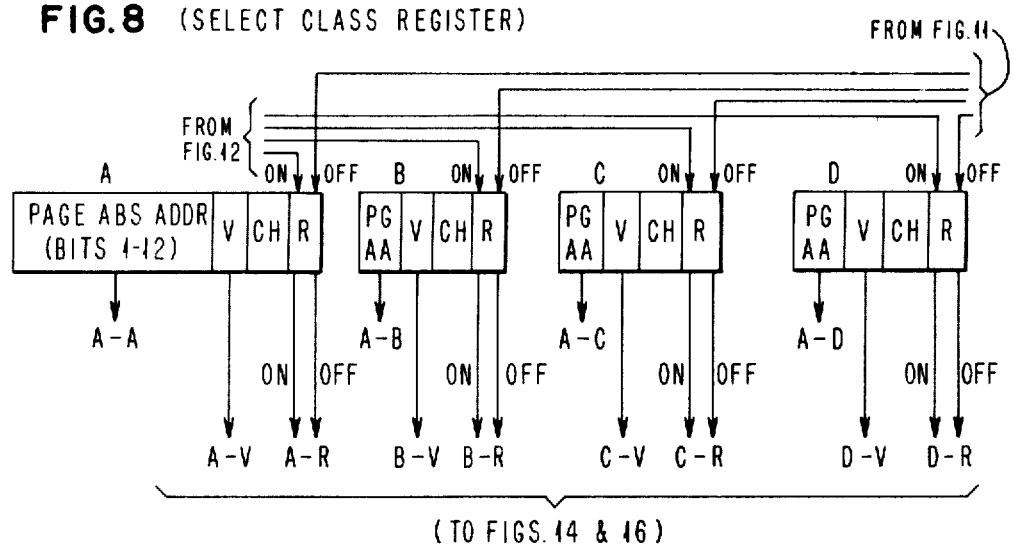
FIG. 9
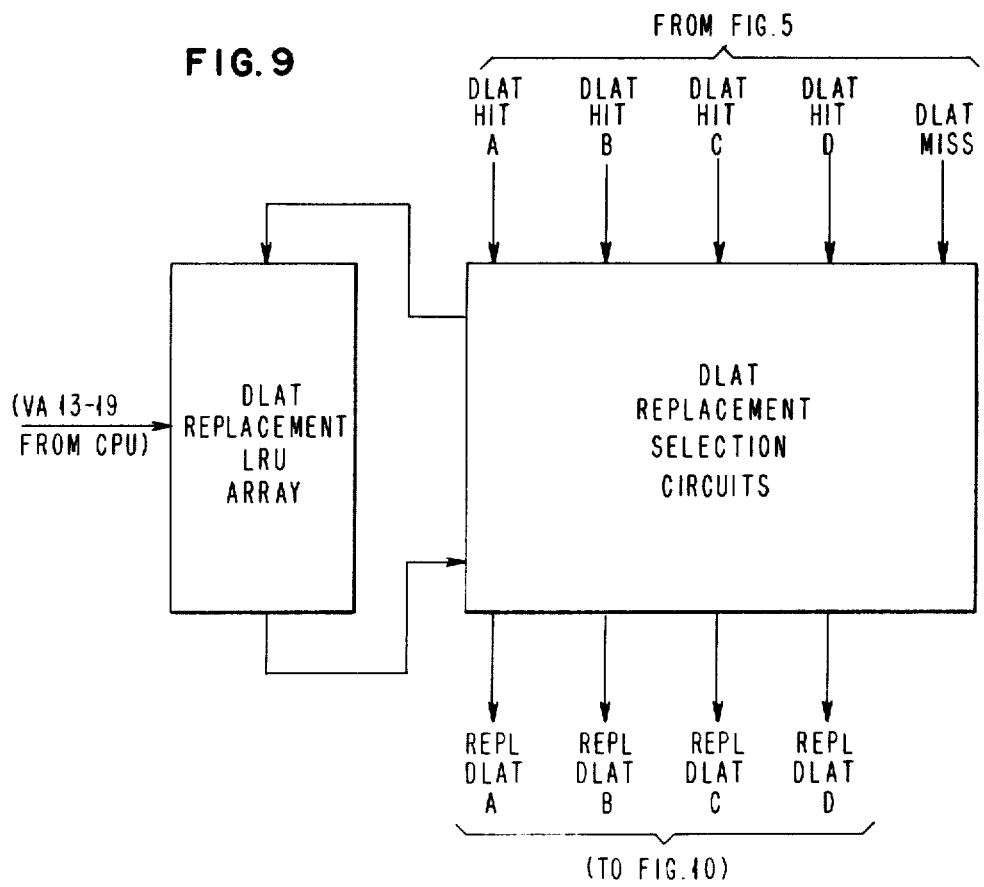

(L2 R FLAG BIT TURN OFF)

(L2 R FLAG BIT TURN ON)

SECOND LEVEL CACHE REPLACEMENT METHOD AND APPARATUS

INTRODUCTION

The invention relates to second level cache replacement controls that minimize the cache misses in a second level cache to achieve improved system performance.

PRIOR ART ANALYSIS

The prior art discloses three-level storage hierarchies using first level (L1) and second level (L2) caches. Generally, the L2 cache is basically the same as an L1 cache, except the L2 cache usually is larger and slower than the L1 cache, and the L2 block size may be larger. The L2 block size may be the same as or larger than the L1 block size, and the L2 cache may have the same or a greater number of blocks than the L1 cache. Each entry in the L1 and L2 directories may store the MS address of a block in the L1 and L2 caches, respectively, and each entry may have flag bits such as "valid" and "change".

A DLAT (dynamic look-aside buffer) is commonly provided with the L1 cache to avoid repetition in the translation of CPU request with virtual addresses (VAs). The DLAT, and L1 directory are referenced by each CPU VA request, whether L1 uses a store-thru or store-in-buffer type of cache. If L1 is a store-thru cache, each CPU store request also references the L2 directory. An L1 directory miss having an L2 directory hit causes the L1 request line to be copied from the L2 cache to the L1 cache. If there is an L2 directory miss, the requested block is not in the L2 cache, and it is then fetched from main storage (MS) into the L2 cache.

Because of the limited number of entries in any cache or DLAT, they each have some type of replacement selection means to free up an entry after all addressable entries become full, so that a new block or line may be received by the cache or DLAT. The most preferred replacement selection algorithm is the LRU (least recently used) algorithm. Its theory is to select the addressable entry which has had the longest amount of time expire from its last access, i.e. longest non-used entry, with the assumption that this entry has the least likelihood of future use. While this algorithm is simple in theory, it is difficult to apply in practice. All known pragmatic LRU selection replacement circuits do not provide true LRU operations under all circumstances, due to limitations in cost, complexity, or speed of operation.

In the case of an L1 cache, it is well known that the LRU determination should measure the time for each entry from its last access by the CPU.

An L2 cache LRU operation is more complex. The prior art incorrectly assumes the L2 LRU entry determination should measure the time for each entry from the last access to that entry. The error is the failure to recognize that it is not the last access to the L2 entry which determines its LRU status. The correct LRU theory for an L2 cache requires that the L2 LRU entry determination be measured from the time the CPU last accessed the data represented by the L2 entry, which is the time from when the CPU last accessed a corresponding L1 entry.

The practical problem is that L1 accesses (if they are hits) are not apparent to L2. The L2 cache is only accessed occasionally when an L1 cache miss occurs. Most accessing of the L1 cache does not involve any L1 cache miss. Thus, no L2 accessing occurs for most L1 cache accesses, i.e. L1 cache hits are entirely handled at L1.

The goal of the L2 LRU logic is to minimize L2 misses for a given amount of L2 capacity. To understand the best criteria for L2 management one must understand the current operation of L1 caches. Presently, L1 caches achieve their poorest hit ratios in high task switching environments. This is because L1 capacities of about 64 KB are usually not large enough to hold the lines associated with many tasks concurrently. Consequently, many of the L1 misses occur immediately after a task switch in loading up the new task. The new task lines replace the old task lines, even when the old task is returned to in a relatively short time.

The major function of the L2 cache is to hold the pages associated with many tasks. Although the number of L1 misses are not changed, the miss penalty for L1 misses is reduced. The key is that there must be very few L2 misses to main memory, otherwise the average L1 miss penalty is not reduced and then having an L2 cache would not be economically justified.

The criteria for the L2 LRU is as follows:

1. Don't replace an L2 page if there is L1 activity on its lines.

2. Hold a page at L2 as long as possible after its activity has ceased at L1.

3. When there are multiple pages at L2 whose activity appears to have ceased at L1, discard the page from L2 whose activity at L1 has ceased the longest time (LRU at L1) as being the least likely to encounter a subsequent task switch.

The most obvious but misleading way to manage the L2 LRU is to drive the L2 LRU replacement selection circuits with the L2 line references which are L1 misses. There are cases where the L2 reference activity can provide a misleading indication of L1 activity which leads to erroneous L2 LRU decisions, as follows:

1. One or more lines of a page have very high L1 reference activity, therefore, very little or no L2 reference activity exists. L2 can not differentiate such high L1 activity from no activity at L1 for a page.

2. A page which has occasional references across several lines in L1 will have higher L2 activity than a very active page within a single line in L1.

3. A medium active L1 line keeps getting replaced and refetched to L1 because of the higher activity of its neighbors in the same L1 congruence class. This causes high L2 reference activity which may keep the page at L2 longer than it should, especially if the other lines in the page are not active at L1.

In summary, faulty L2 page replacement may occur for an L2 directory that sees only L1 references that miss at level 1. (On the other hand in the subject invention, the DLAT sees every L1 reference and integrates it over an entire page rather than only over a single line.)

False LRU determinations result in the prior art approach of using the last access to an L2 entry as the basis for determining its LRU status, because a very recent access may have occurred to a corresponding L1 entry even though the corresponding L2 entry has not had an access in a long time. In fact, the more frequent an L1 entry is accessed, the less frequently is the corresponding L2 entry likely to be accessed, since no L1 miss is likely to occur to cause an access to the L2 entry.

The prior art terminology for an L2 access is an "L1 miss" or "to copy L2 data". These L2 accesses are used in the prior art for L2 entry replacement selection.

U.S. Pat. No. 4,181,937 deals with a replacement selection scheme for an L2 cache buffer in a three-level storage hierarchy. The L2 buffer is common to all first level caches in an MP. The L2 replacement selection provides for each cache block a copy flag bit for each processor in the MP. A processor's copy flag bit is set on if the respective processor's first level cache copies that block from L2 to L1. The block having the fewest flag bits on (i.e. least number of processors with a copy) is a candidate for replacement. This patent's replacement selection circuits therefore depend on accesses to L2, i.e. copying a buffer (L2).

U.S. Pat. No. 3,938,097 provides an L2 replacement selection means allegedly using an LRU algorithm for an L2 cache, in which each block (i.e. line) in an L2 cache in any processor of an MP has a counter decremented by each access to the L1 cache. When that counter counts to n, an L1 cache miss is forced, which causes the corresponding block in the L2 cache to be accessed, so that it will not become a least-recently-used candidate for block replacement from main storage. That is, every nth L1 hit is forced to act as an L1 miss in order to provide an L2 access for the L2 LRU determination. This patent's forcing of L1 misses that are unnecessary for a CPU data access undesirably degrades system performance.

SUMMARY OF THE INVENTION

The invention provides a level 2 (L2) cache replacement selection method and means that implements the well known LRU algorithm in a novel manner. The invention operates in a virtual addressing architecture, which is used solely or mixed with a small proportion of real address requests as used by current large data processing systems. That is, current large processing systems have been found to statistically use a small proportion of real addresses intermixed with a high proportion of virtual addresses. The L2 cache may be a store-in-buffer (SIB) cache or a store-thru (ST) cache, and it may operate with an L1 cache which may be either a store-thru or SIB. The L1 cache is constructed of fast technology, the L2 cache with slower (and cheaper) technology, and the L3 main storage (MS) may use a slower (and still cheaper) technology. Also in an MP configuration, a separate L2 cache may be provided for plural central processors. That is, a respective L2 cache may be provided for each L1 cache, or a common L2 cache may be shared by plural L1 caches. In either case, each L2 cache uses the replacement selection method of this invention.

The objects and advantages of the subject invention are to provide L2 replacement selection controls that:

1. Reduce the L2 misses for a given L2 capacity.
2. Are relatively easy to implement.
3. Obtain LRU replacement operation for an L2 cache.
4. Receive a form of communication from L1 representing the high rate of CPU accesses at L1 in a manner which can match the slower L2 cache technology.
5. Operates for an L2 cache which uses a block size equal to the size of the block addressed by each translation address in a directory look-aside buffer (DLAT).
6. Signals each DLAT replaced page to the L2 cache directory on a DLAT miss to enable that page to become a replacement candidate in the L2 cache.

7. Samples DLAT hits of requested pages to enable those pages not to become a replacement candidate in the L2 cache directory.
8. Uses L1 cache misses to sample the high-frequency DLAT hits in order to reduce the frequency of communications to the L2 cache directory of pages that are not candidates for L2 replacement.
9. Uses real address requests (which bypass the DLAT) by communicating the L1 cache misses and their replaced addresses to the L2 cache directory to enable the designation of:
   (1) L2 entries at the L1 requested addresses as candidates for L2 replacement, and
   (2) L2 entries at the L1 requested address as not being candidates for replacement.

The invention provides a replacement (R) flag for each entry in an L2 cache directory which represents a page block in the L2 cache. When turned on, the R bit indicates its associated page is a candidate for replacement in the L2 cache. However, the page may continue to be accessed in the L2 cache until it is actually replaced. When the R bit is off, its associated L2 page is not a candidate for replacement unless all R bits in that class are off. The R flag bits are set in the L2 replacement selection controls as follows:

A R bit is turned on (to indicate its L2 page is a replacement candidate) under these conditions:

1. All R bits are turned on for Power on, IPL, or CPU reset.
2. The R bit is turned on for a L2 cache entry corresponding to the DLAT replaced page upon a DLAT miss with replacement.
3. The R bit is turned on for a L2 cache entry corresponding to a L1 cache replaced line for a L1 request bypassing the DLAT (e.g. real address request).

A R bit is turned off (to indicate its L2 page is not a replacement candidate) under these conditions:

1. The R bit is turned off for a L2 cache entry corresponding to the CPU requested address causing a DLAT hit with a L1 cache miss.
2. The R bit is turned off for a L2 cache entry corresponding to the CPU requested address causing an L1 cache miss which bypasses the DLAT (e.g. real address).

Signals from L1 to select, turn on and turn off the replacement flags also control the generation of new LRU pointers in an L2 LRU replacement array. Each array pointer selects the LRU entry in a respective congruence class in the L2 directory. A new pointer is generated for the congruence class of the selected entry when that entry's R flag changes from a no replacement state to a replacement state. Any subsequent turn on signal to an already turned on R bit is not allowed to effect the LRU pointer generated at the time of the initial R bit turn on.

If a L2 page's R bit is turned off, subsequent turn off signals for that entry may be permitted to the L2 LRU array input controls. This is so that when all R bits are off in that class, which is a rare occurrence but may happen, then the page referenced longest ago will be pointed to by the LRU for replacement.

The change of an R bit (i.e. by turn on or turn off) causes the L2 LRU array input to generate a new LRU pointer for the L2 directory class being addressed. In the case of a turn on, the new pointer points away from the entry having the turn on; however, if the R turn on was correct, the entry's non-use causes the normal operation of the LRU circuits to shortly thereafter generate a pointer for this non-used entry which makes it the replacement candidate for its congruence class unless of course another page in the class had its R bit turned on earlier. If the R turn on was incorrect, the initial turnaway of the pointer to another entry in the same class allows time for the normal LRU circuit operation to determine the correctness of the turn on by allowing the turning off of that R bit by a subsequent access to the data in its associated page, such as is the case of another CPU's activity turning off the L2 R flag, thereby removing the replacement candidate status for that page.

In summary, the invention is simple and efficient because it communicated to L2 the DLAT replacements at L1 which quite accurately and very effectively provide a reflection of the L1 CPU activity in a uniprocessor or multiprocessor system using an intermediate cache. Only an additional R flag is required for each L2 directory entry along with a small amount of associated control circuits to add this invention to an L2 cache.

These and other objects, features and advantages of the invention may be more fully understood and appreciated by considering the following detailed description in association with the accompanying drawings.

BRIEF DESCRIPTION OF THE DRAWINGS

FIG. 8 represents the form of the registers comprising any single class within the L2 directory in FIG. 7.

FIG. 9 illustrates a block diagram of the DLAT array and DLAT replacement selection circuits used in the hierarchy in FIG. 1.

FIG. 18 provides circuits which generate an L1 castout address for a L1 castout address when the change bit is on.

DESCRIPTION OF THE PREFERRED EMBODIMENTS

A. Background To The Preferred Embodiments

Figure 3:
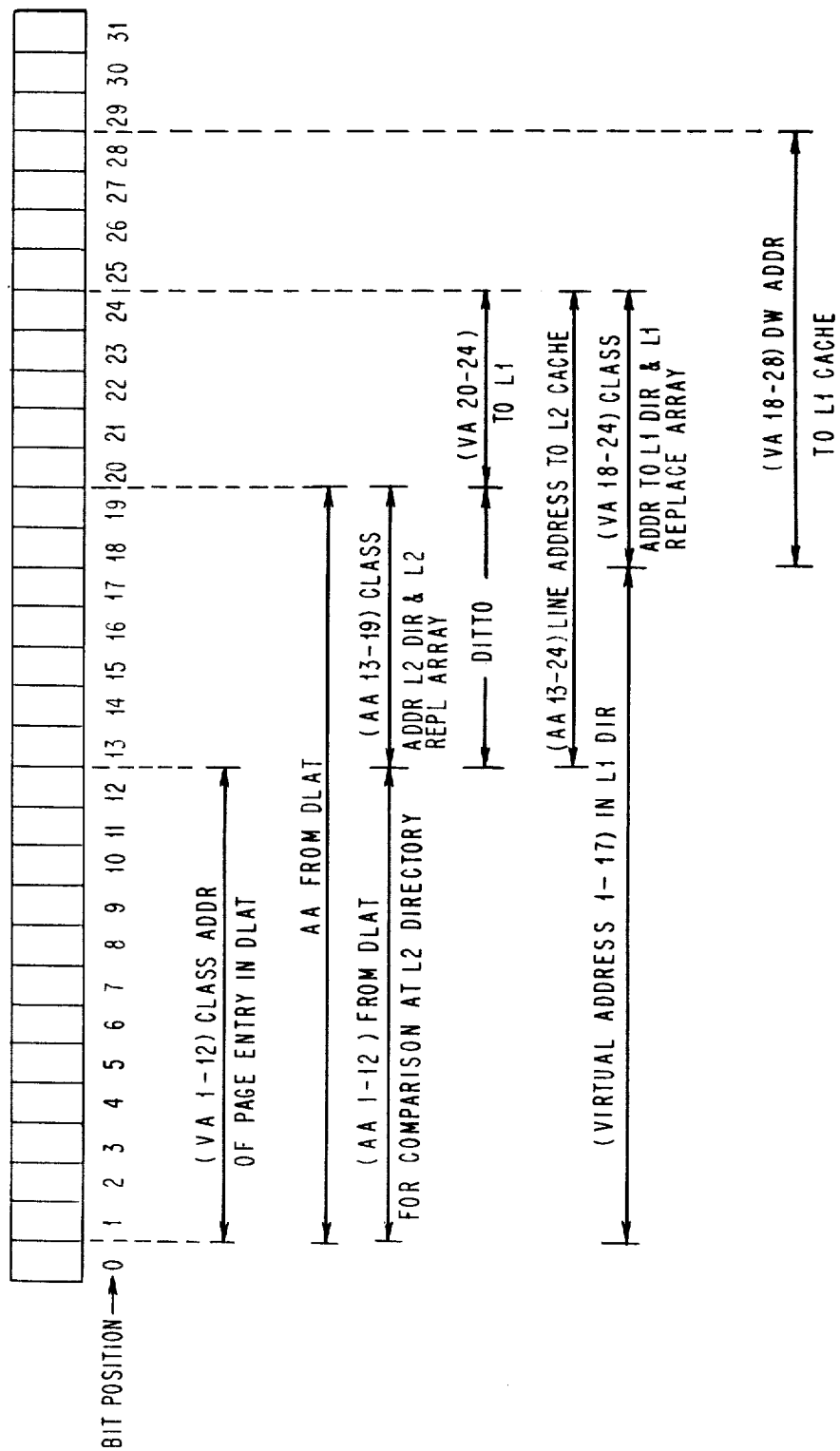
FIG. 3 is an address bit position diagram representing the various bit positions in the various types of addresses used in the preferred embodiment.
Figure 4:
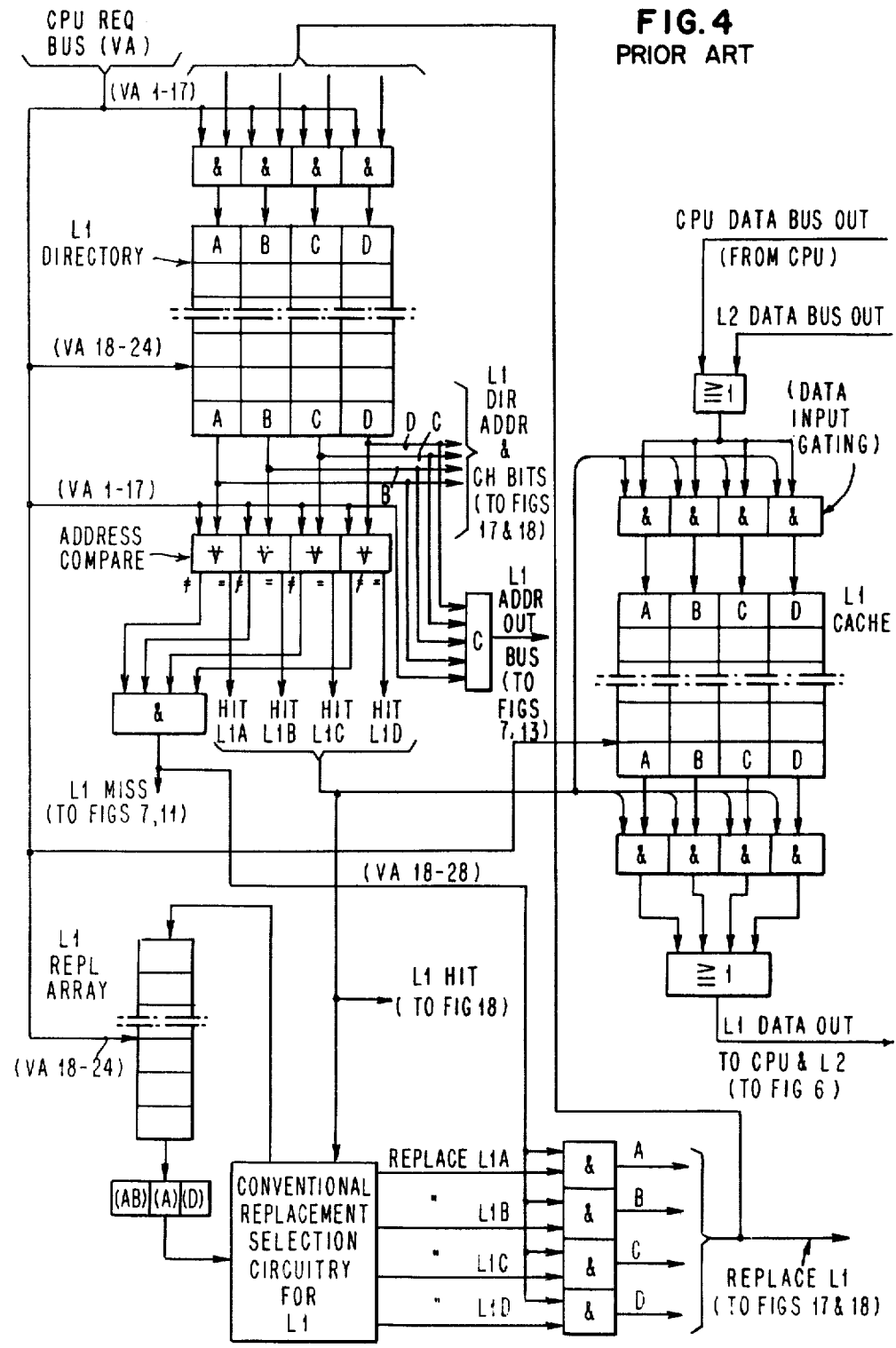
FIG. 4 is a detailed diagram of a conventional L1 cache used in the hierarchy in FIG. 1.
Figure 5:
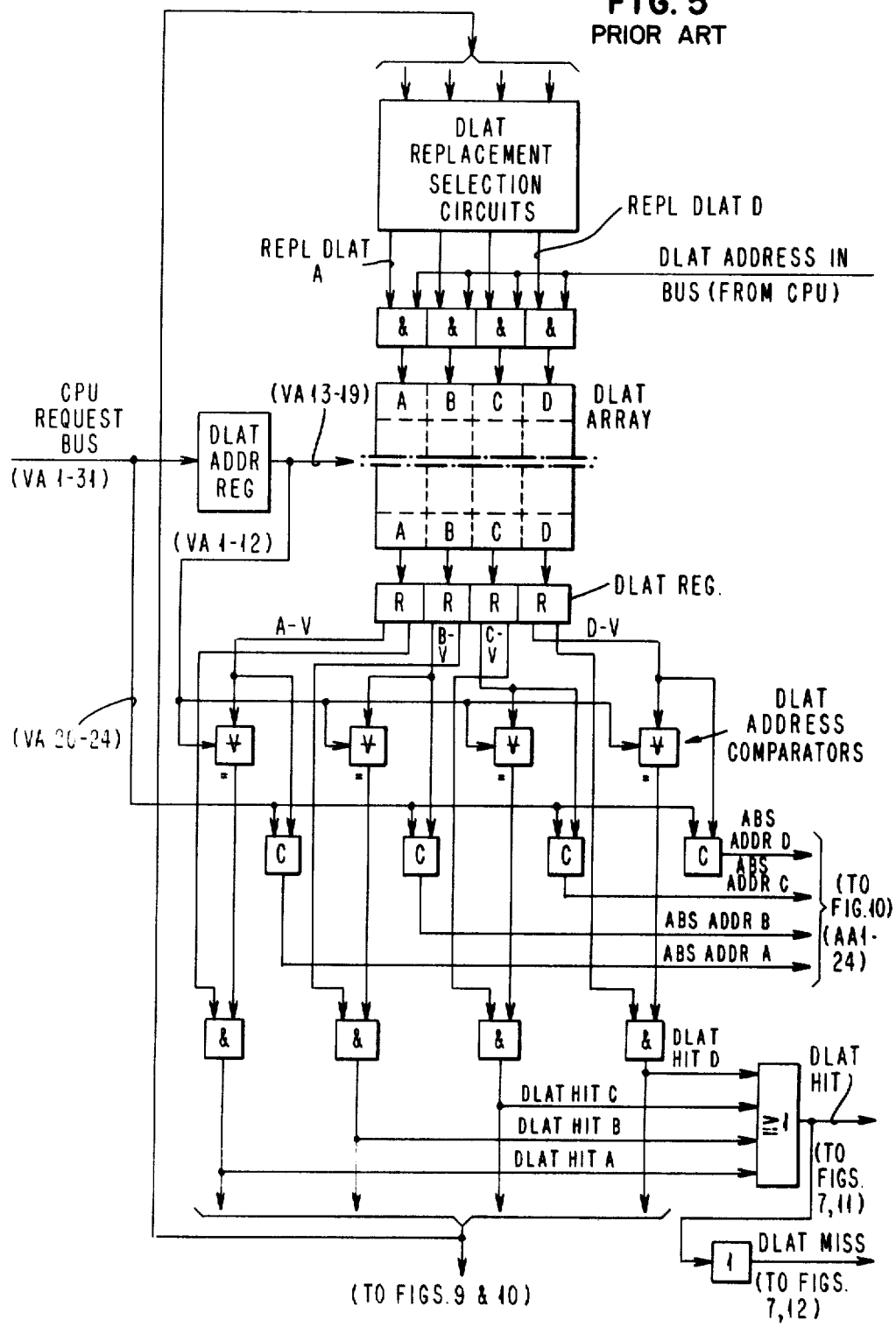
FIG. 5 is a detailed diagram of a conventional DLAT (directory look-aside table) used in the hierarchy in FIG. 1.

The level 1 (L1) directory in FIG. 4 and the directory look-aside table (DLAT) in FIG. 5 are conventional and are each constructed in the manner taught by the prior art. The processor (CPU) generates a storage request at L1 using a virtual address (VA). The bit positions in the virtual address going to the directory and DLAT are defined in FIG. 3. The bit positions given in parenthesis as addresses to the DLAT, directories and caches in the detailed figures in this specification refer to the bit positions in FIG. 3, which can apply to either a virtual address, real address or absolute address.

Each entry in the directory and DLAT holds bit positions of both the virtual address (VA) and the translated absolute address (AA). The VA bits are needed to compare with the CPU requested address which is a virtual address. The absolute address of each page represented in the DLAT is the translation of the VA needed to address main storage when there is an L1 directory noncompare (i.e. line miss).

The L1 directory holds the absolute address of its valid entries. I/O channels and other processors cross-interrogate the L1 directory using an absolute address. There are cases when a line is valid in the L1 cache but there is no valid DLAT entry for it.

The L1 directory, DLAT and DAT logic need not change when a L2 cache is put into the storage hierarchy. The major difference is that on a line miss (L1 directory non-compare) the absolute address from the DLAT is sent to L2 instead of to main storage (MS). If there is an L2 directory compare, the line is moved from the L2 cache to the L1 cache. If the L2 directory does not compare, then the absolute address is sent to MS, and the page is copied from MS into the L2 cache, the absolute address is stored in the L2 directory, and the requested line in the page is simultaneously copied into the L1 cache, and the requested double word(s) is simultaneously copied into the CPU.

Figure 6:
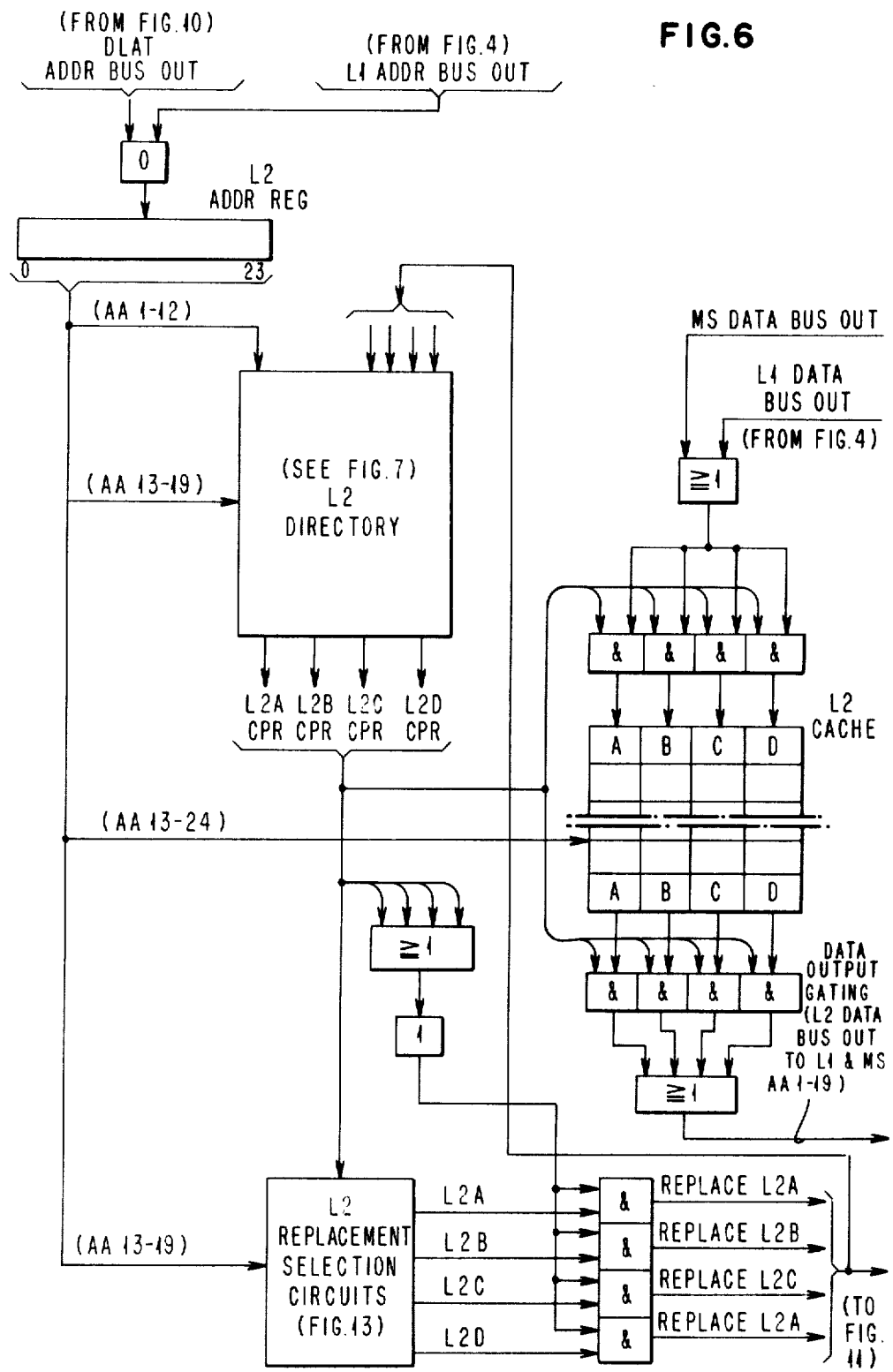
FIG. 6 is a detailed diagram of a level 2 cache and its associated circuits used in the hierarchy in FIG. 1.
Figure 7:
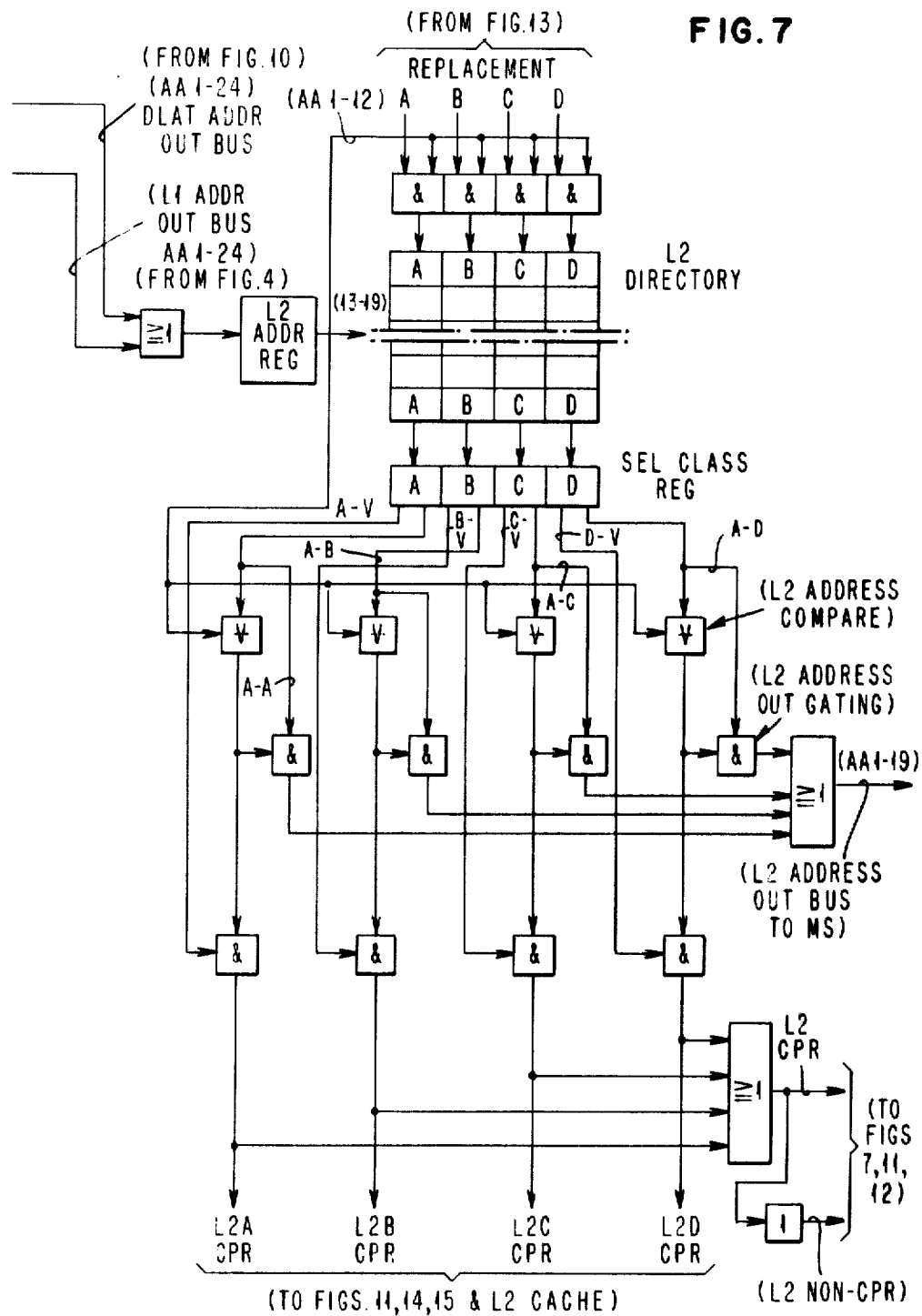
FIG. 7 is a detailed diagram of the L2 directory found in FIG. 6.

FIGS. 6 and 7 show a four-way set associative L2 cache and its L2 directory which are constructed in the prior-art manner of the L1 directory and L1 cache except for the novel R flag bit added for each L2 directory entry. Each L2 directory entry also holds an absolute address (AA) and other flag bits for a page of data in the L2 cache.

The L2 circuits are made of slower but cheaper technology than the L1 circuits. However, the L2 circuits are faster than the MS circuit technology.

The designation "page" is used to refer to each block in the L2 cache to differentiate an L2 block from the blocks in the L1 cache which are referred to as "lines". The L2 block size is equal to the page size managed by software in main storage which is usually referred to as a "page". Typically in todays large IBM System/370 processors, the L1 block size (line) is 64 or 128 bytes and the software managed page size is 4K bytes. In the described embodiment, a L1 line size of 128 bytes is used, and a L2 page size of 4096 bytes is used. The L1 directory, the L2 directory and the DLAT are each assumed to be four-way set associative, i.e. four entries in each congruence class. In a UP or MP with L1 and L2 caches provided with each processor, the DLAT may hold as many addresses as the L2 directory. In an MP with each processor having its own L1 cache, but with one L2 cache used with multiple processors, the L2 cache preferably holds many more addresses than each processor's DLAT.

The DLAT and the L1 and L2 caches shown in detail in FIGS. 4, 5, 6 and 7 each internally operate in the conventional manner, except for the L2 replacement selection function. In FIG. 5, the symbol C in a box is a concatination function, in which each box concatinates the DLAT absolute address bits 1–19 with VA address bits 20–24 (which are the same as AA bits 20–24). They provide the selected entries AA on the DLAT absolute address output A, B, C or D.

Thus, the processor initiates a MS request at level 1 by sending a virtual address to the DLAT and L1 directory, which select a congruence class in each. The DLAT array and L1 directory array each read out the four addresses of the selected class of entries A, B, C and D in parallel, which are compared with the virtual address from the processor.

If none of the four addresses read from the DLAT compare, then the dynamic address translation (DAT) circuit is requested to translate the virtual address to a real address by fetching an entry from each of the segment and page tables. This translated address is prefixed into an absolute address, which is then stored in the DLAT array, replacing the least-recently-used (LRU) entry in the DLAT when necessary.

If on a CPU request, the requested VA compares with both the VA in the DLAT and in the L1 directory (line hit), then the associated word is read/stored from-/into the L1 cache and the CPU request is complete. Over 95% of the CPU requests generally are accessed in this manner.

However, if there is a DLAT compare but not a L1 directory compare, then the absolute address is obtained from the DLAT, which is selected by the requested address comparing with one of the four entry addresses (A, B, C or D) in the selected class. The absolute address from the selected DLAT entry is a page address which is concatenated with VA bits 20–24 to obtain a line address which is sent to the L2 cache directory for fetching the line from the L2 cache to the L1 cache, if the addressed page is in the L2 cache. The address of this fetched line is stored in the L1 directory.

The L1 and L2 directories each use a different set of bit positions from the virtual and absolute addresses, respectively, to address the correct classes in the respective directories, because their block sizes are different.

B. The Preferred Embodiment

A novel difference caused by this invention between the L1 and L2 directories is that each entry in the L2 directory is provided with a "replacement flag" which is referred to as the "R" bit. The purpose of the R bit is to improve system performance by minimizing the cache misses at L2 for a given L2 cache capacity.

FIG. 8 illustrates the R-flag bit in each entry in each L2 congruence class. FIG. 7 illustrates the layout of a four-way associative L2 directory containing the congruence classes of FIG. 8 as rows therein.

The R flag enables CPU accesses to the DLAT at L1 to control the L2 page replacement selection. The DLAT page address replacement selection is the summation of the page access activity by the CPU, provided that the DLAT replacement selection is based on a LRU operation. That is, this invention inputs to the L2 page replacement selection function the L1 DLAT page replacement operation. For example, the L1 DLAT replacement selection circuits may use the technique described in the IBM TDB article published July 1971 on page 430 by A. Weinberger entitled "Buffer Store Replacement by Selection Based on Probable Least Recent Usage". Statistically, 1% or less of the CPU requests have a DLAT miss, which this invention provides as an input to the L2 cache replacement selection function. The 1% misses have a frequency rate much slower than the CPU request rate. The slower DLAT miss rate is capable of matching the slower switching speed of the L2 circuits, wherein the 99% DLAT hit rate would be a missmatch.

Each DLAT miss normally replaces an existing DLAT entry to make room for the requesting VA and its translated page AA.

The invention communicates each DLAT replaced page address to L2 to make the corresponding page a candidate for L2 cache replacement.

The DLAT hits by CPU requested pages (occurring for about 99% of CPU requests) are only communicated to L2 if they have a L1 cache directory miss which occurs for about 5% of CPU requests. Thus, the L1 hits sample about 5% of the DLAT hits to reduce the DLAT hit frequency rate communicated to L2 to match the L2 circuit slow speed limitations. However, a summarization of the L1 DLAT hit occurrences is inherently included in the L1 DLAT page replacement determinations, i.e. a page is replaced because it did not have a sufficiently recent DLAT hit by any CPU request. Therefore, the low frequency DLAT replacement communication to L2 inherently represents the frequency of DLAT hits to L2, in the absence of the communication of DLAT hits. However, for reasons to be understood later herein, the L2 communicated DLAT misses enable correctional advantages for improving the replacement selection determinations for the DLAT.

Hence, the DLAT hits after sampling by L1 cache hits and the DLAT misses have a combined low rate that can easily match the L2 circuit speed.

However, the L2 cache replacement selection is not completely slaved to the DLAT page replacement decisions, and in many situations the L2 replacement function can refuse a DLAT replacement decision of subsequent CPU requests prove it was wrong, which can occasionally happen with any LRU determination. Or, in multi-processing, another CPU may still be accessing one or more lines in the page.

The invention operates in an environment in which most CPU requests use virtual addresses. Statistical studies of the job streams on large IBM CPUs have found that 95% or more of the CPU requests use virtual addresses (i.e. DAT on). Therefore, the small percentage of CPU accesses using real addresses (i.e. DAT off) are expected to have an insignificant effect on the L2 replacement selection operations controlled by this invention.

Figure 2:
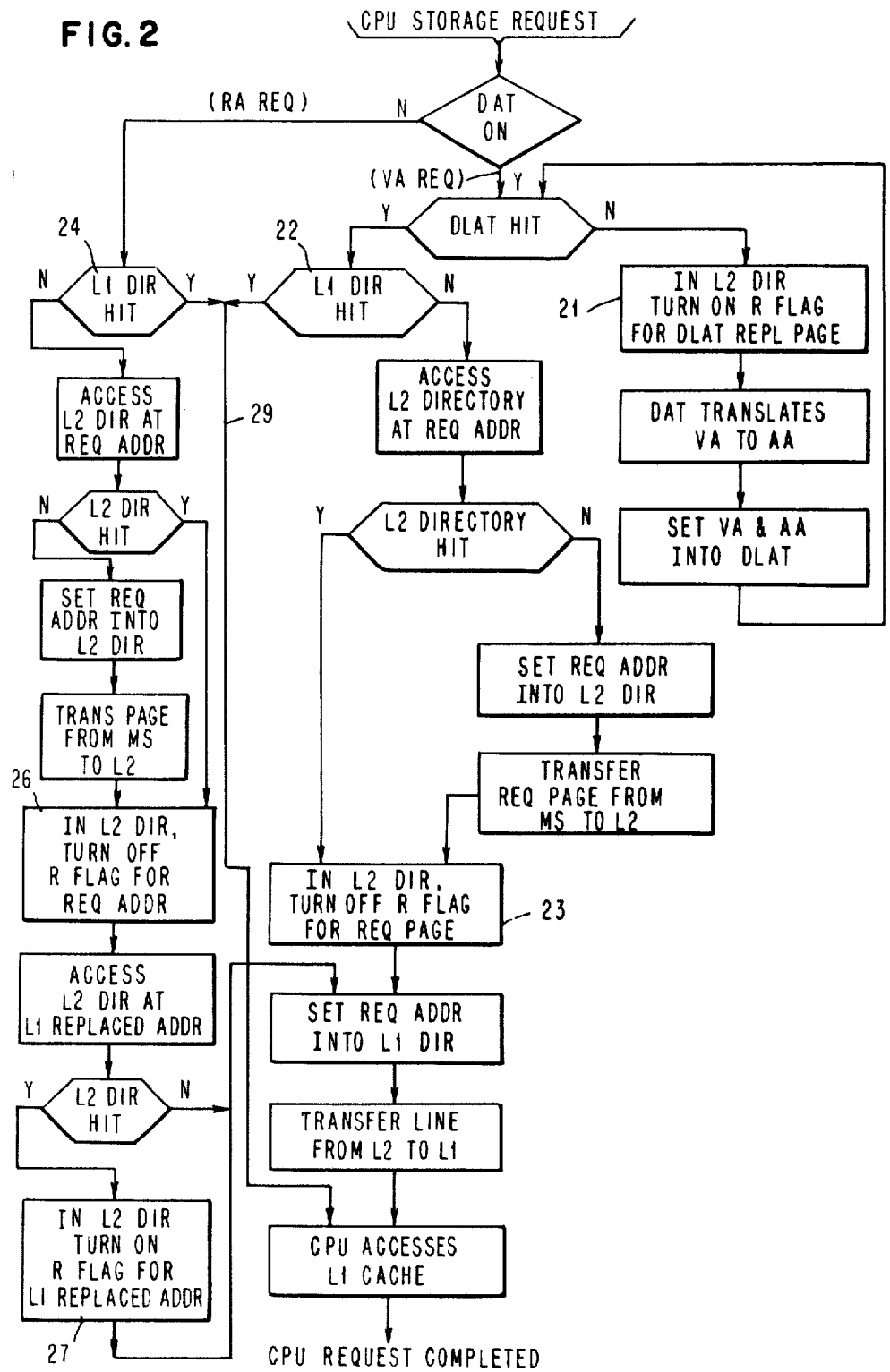
FIG. 2 is a flow diagram of the method of the invention.

FIG. 2 is a flow diagram of the method of this invention. If DAT is on (i.e. CPU requests use VAs), some CPU requests will miss in the DLAT and displace other entries in the DLAT. The displaced page address is sent to L2 to select the corresponding L2 directory entry. Box 21 turns on the R flag in the L2 entry selected by the DLAT replaced page address, to make this L2 entry a candidate for L2 replacement. The DLAT miss is one of two DLAT events used by this invention to communicate an R setting from L1 to L2.

Those DLAT hits for CPU requests which have L1 cache misses are also communicated to L2 (the no exit of box 22) to turn off the R flag for the L2 requested page in box 23 to make this L2 entry non-replaceable. The L1 cache displaced address is not used in this DLAT hit communication to L2.

This invention takes advantage of the fact that a L1 to L2 communication occurs for a L1 miss, regardless of the existence of this invention in the storage hierarchy. That is, this invention uses the existing L1 hit communication to filter the communication of DLAT hit from the large number of DLAT hits occurring at high frequency. Hence, very little additional hardware is needed to communicate the filtered DLAT hits. In other words, the particular type of DLAT hit filtering obtained by the L1 cache miss permits the use of L1 to L2 communication hardware provided for normal line fetch requests to L2. The DLAT miss communications by this invention do not necessarily overlap L1 cache misses, but DLAT misses also occur at a low frequency, (i.e. for less than 1% of CPU requests).

Also, the R flag control method in FIG. 2 handles intermixed CPU real addresse (RA) requests. If requested RAs are put into the DLAT, the invention will operate in the same manner with RAs as with VAs. However, most large CPUs only used the DLAT for VAs and RAs bypass the DLAT but access the L1 cache. The preferred method embodiment in FIG. 2 assumes the latter. Each RA request having a L1 cache miss has its requested address sent to L2 to select its L2 page entry and turn off that page's R flag in box 26. Also, an L1 cache miss usually causes a replaced address in the L1 cache congruence class addressed by the missed RA request. This L1 cache replaced address is also sent to L2 to select its L2 page entry and turn on its R flag in box 27 to make this L2 entry a candidate for L2 replacement. RA L1 misses occur at a low frequency (i.e. for less than 5% of CPU requests).

As a result, the frequency rate for the communications from L1 to L2 for the R bit operations is 1/20 to 1/10 of the L1 operation rate for CPU requests. The preferred embodiment's slower rate of communicated R bit switching signals can be handled easily by the L2 cache directory circuits which are usually made of slower, cheaper circuits than the L1 directory, L1 cache, or DLAT. On the other hand, if the L1 to L2 communication of the R bit switching signals were done for hit as well as miss signals (i.e. at the L1 rate), a slower L2 technology could not handle the L1 rate. Thus, DLAT hits which have cache hits take path 29 in FIG. 2 and are not communicated to L2 in the preferred embodiment because their rate of occurrence is too fast for the assumed L2 circuit speed limitation. However, the inventive concept in this application also includes the communication of all DLAT hits to L2 so that each DLAT hit could turn off the R bit for the DLAT requested page entries in the L2 cache. The non-communication to L2 of the DLAT hit having a L1 hit to turn off the R flag in the preferred embodiment is a tradeoff which would require L2 to have a very fast R bit switching circuits that could operate at L1 speeds, which may increase cost without significantly improving the L2 replacement efficiency. Multiprocessing with a common L2 cache would require even faster switching circuits than at L1 of each processor. In the latter case, the R bit handling circuits could be made of faster technology to handle the L1 rate while the remainder of L2 is made of the slower, cheaper technology.

The following TABLE 1 represents the conditions in the preferred embodiment for the communication (and non-communication) of R flag switching signals from L1 to L2 for virtual address CPU requests, as follows:

TABLE 1

| Address Compare | | | L2 "R" Flag | | |
|---|---|---|---|---|---|
| DLAT | L1 DIR | L2 DIR | Turn On/Off | Select Address | Comments |
| Yes | Yes | — | N.C. | N.C. | L1 cache hit. No communication (N.C.) to L2. |
| Yes | No | Yes | Off | Requested Page Address | L1 miss & L2 hit. Set address into L1 directory. Transfer line from L2 to L1. |
| Yes | No | No | Off | Requested Page Address | Both L1 & L2 miss. Set address into L1 & L2 directories. Transfer page from MS to L2. Transfer line from L2 to L1. |
| No | Yes | — | On | DLAT Replaced Page Address | DLAT miss. DAT translates VA to RA. Set AA into DLAT. CPU tries L1 access again. |
| No | No | Yes | On | DLAT Replaced Page Address | Same as line 4 above. CPU misses in L1 on next try. Then accesses line in L2. |
| No | No | No | No | DLAT Replaced Page Address | DLAT miss and L1 miss. Line not at L2. DAT translates VA to RA. Set translated address into DLAT's CPU. Then CPU tries L1 access again and misses. |

In TABLE 1, the six rows indicate the different combinations for the states of the DLAT, L1 directory, and L2 directory, and the resulting communication from L1 (if any) to switch the R flag bits, and whether the selected R flag is associated with the CPU requested page address or the DLAT replaced address.

Figure 1:
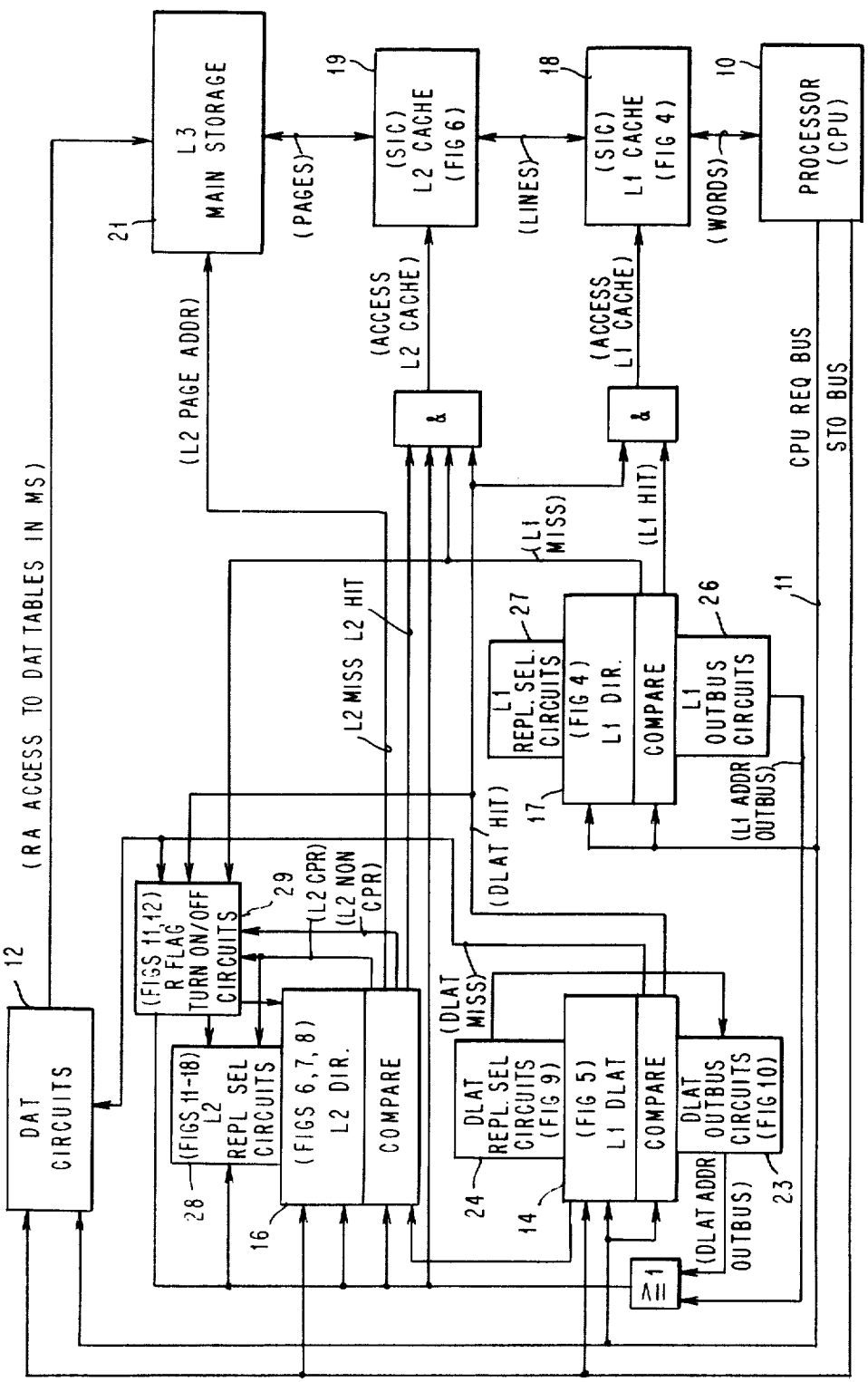
FIG. 1 is a block diagram of a three-level storage hierarchy containing a preferred embodiment of the invention.

The DLAT circuits shown in FIG. 5 and the replacement array and replacement selection circuits for the DLAT shown in FIG. 9 are considered conventional with the DLAT replacement operating in the conventional manner according to the article previously cited herein as published in the IBM Technical Disclosure Bulletin in July 1971 by A. Weinberger. These DLAT circuits and the conventional L1 cache circuits shown in FIG. 4 are illustrated for the purpose of showing that they are part of the inventive combination of circuits embodying this invention shown in FIG. 1.

Figure 10:
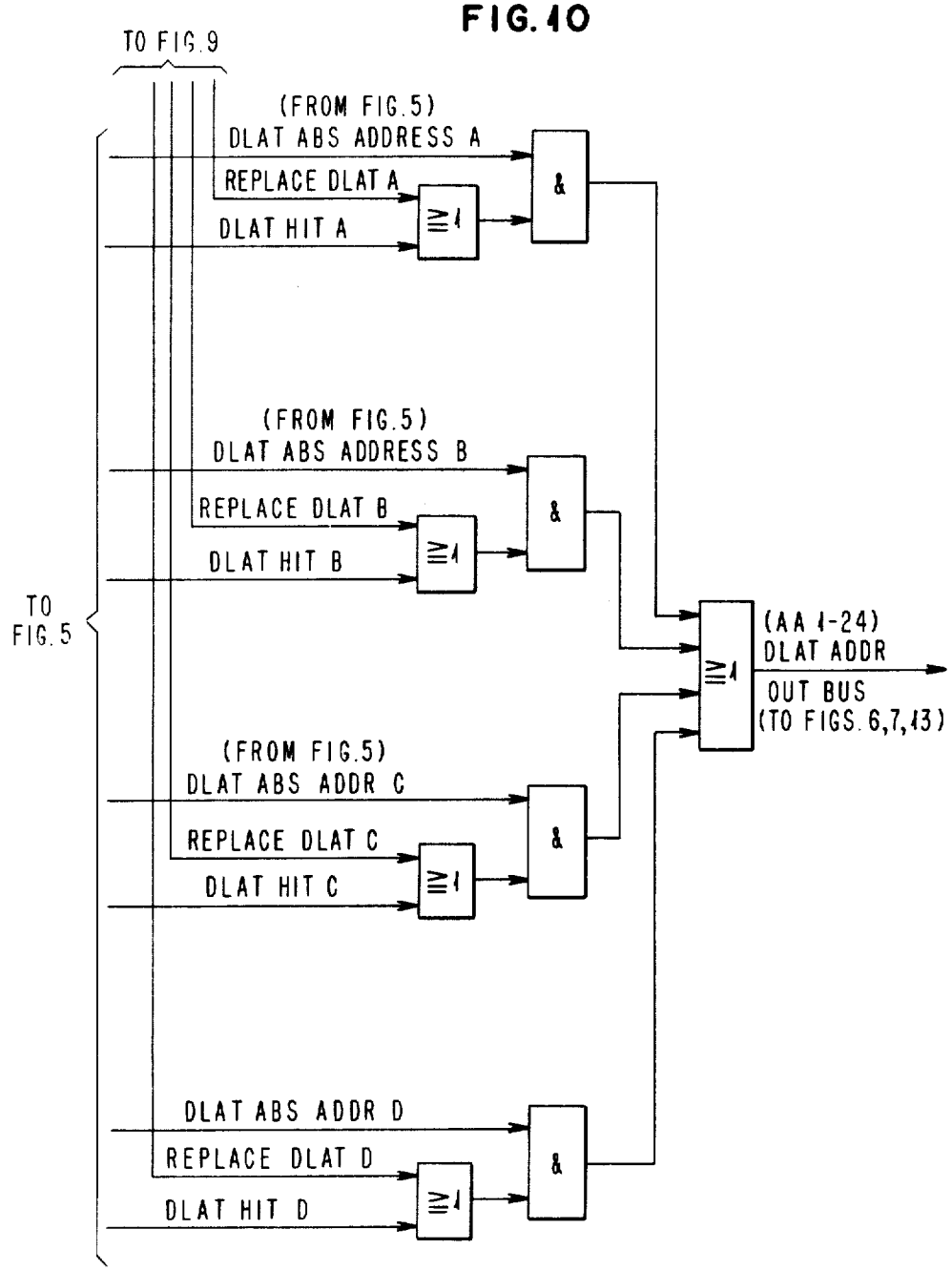
FIG. 10 illustrates in detail the DLAT address out bus circuits used in the embodiment.

Upon a DLAT miss, the required L2 entry is selected in the L2 directory in FIGS. 6 and 7 by the absolute address on the DLAT address out bus shown in FIG. 10, which selects the DLAT replaced address on a DLAT miss, or the CPU requested address on a DLAT hit. No R bit operation occurs when the DLAT and L1 cache both have hits in the preferred embodiment, which therefore does not provide an output from FIG. 10.

Figure 11:
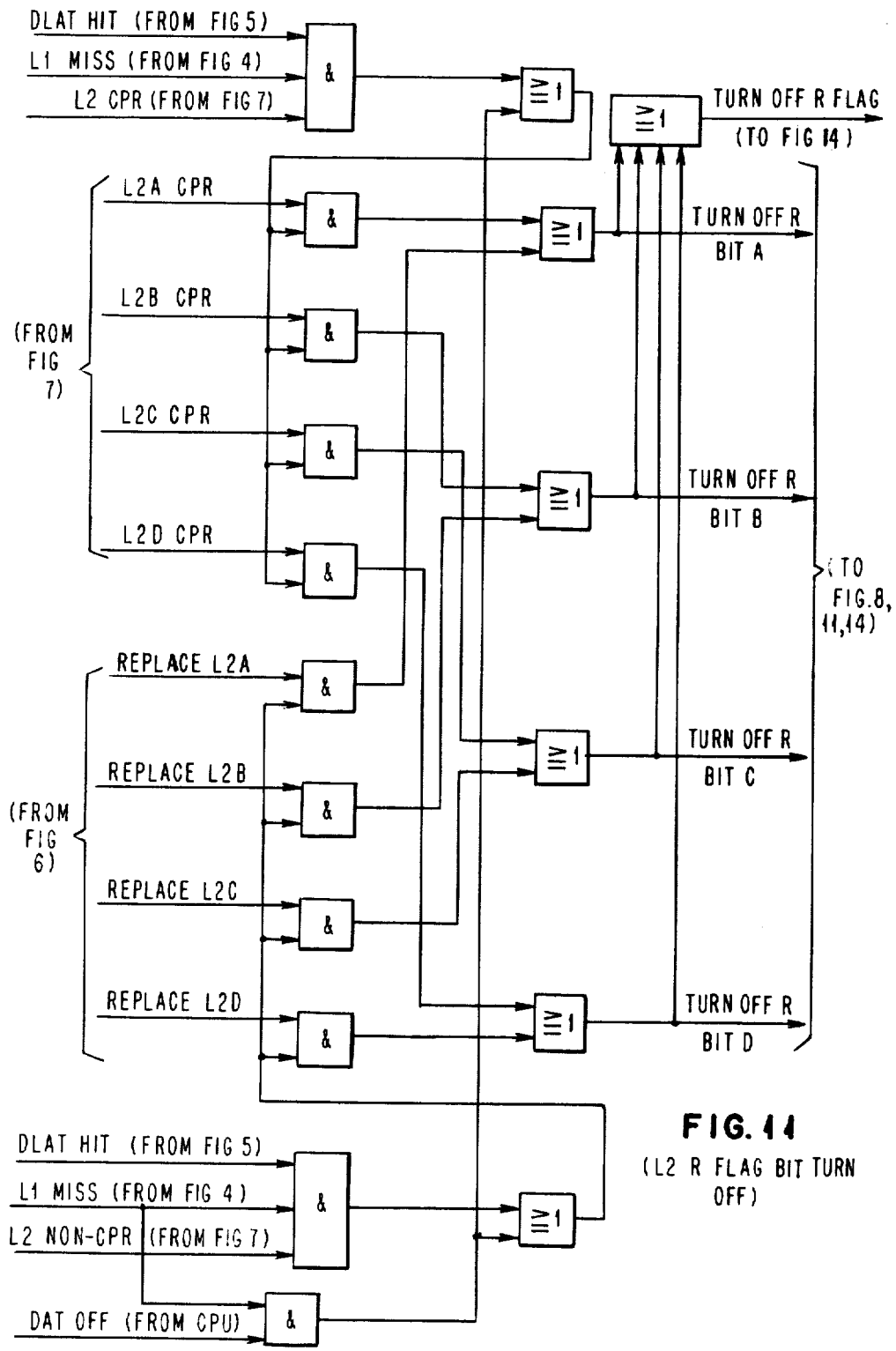
FIGS. 11 and 12 illustrate circuits used in the embodiment for generating the switching signals communicated to the L2 cache for turning on and off the R flags therein.

During a DLAT hit with a L1 cache miss, or an L1 miss with DAT off, the R turn off circuits in FIG. 11 input either (1) the active one of the four L2 compare (CPR) lines that identifies a L2 entry selected by the current CPU request, or (2) the active one of the four L2 replace lines that identifies a L2 cache replacement entry containing the address of the L1 referenced page when none of the four L2 compare lines provides an active signal.

Figure 12:
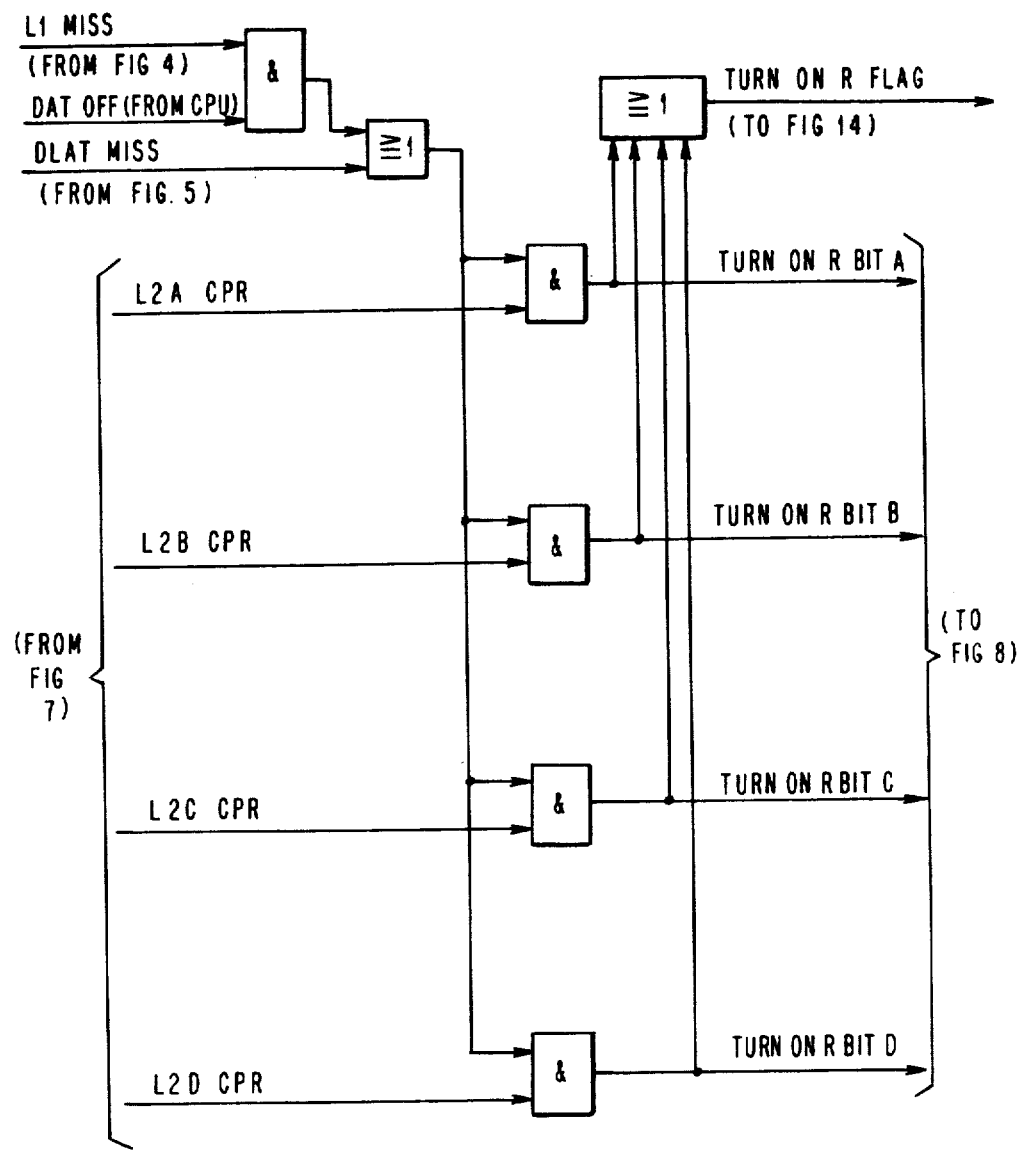
Figure 17:
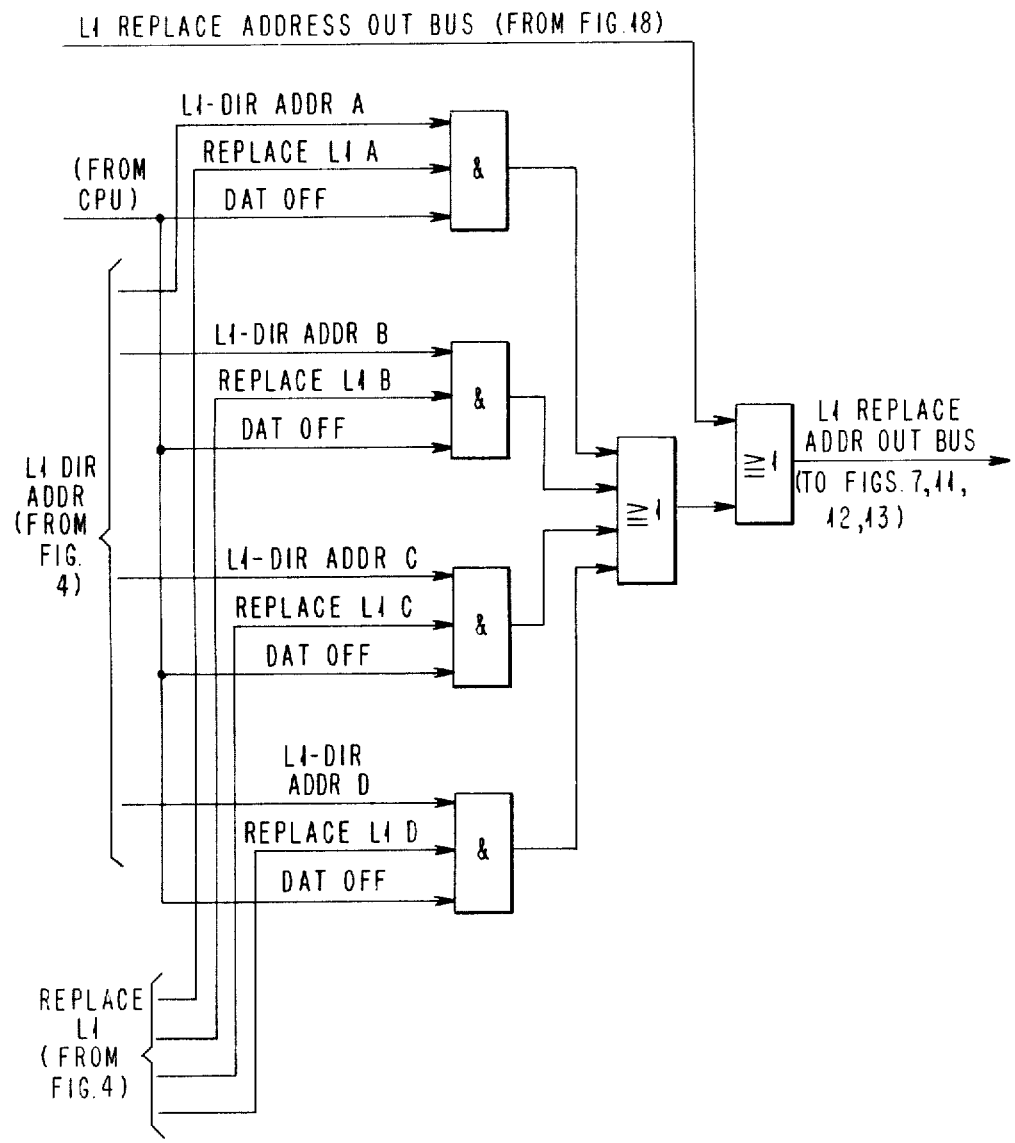
FIG. 17 provides circuits which generate any L1 cache replaced address for a real address request, regardless of the L1 change bit setting.
Figure 18:
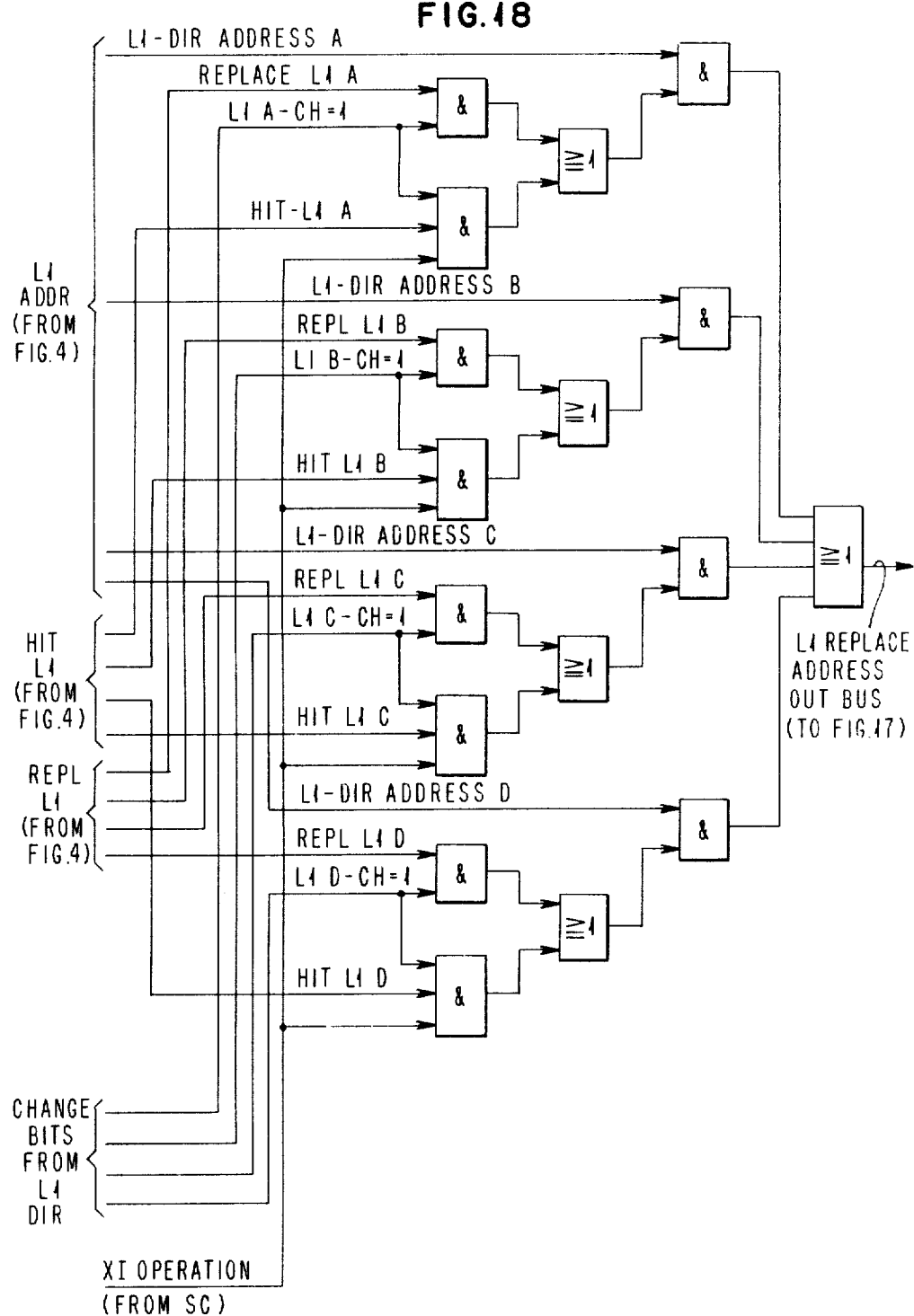

FIG. 12 shows the R bit turn on circuits which are activated by either: (1) a DLAT miss signal from FIG. 5, or (2) a CPU real address request with DAT off. The L2 compare signals are provided only when either there is (1) a DLAT replacement address on the DLAT address out but from FIG. 10 when DAT is on, or (2) an L1 replacement address out bus signal from FIG. 17 when DAT is off.

Figure 13:
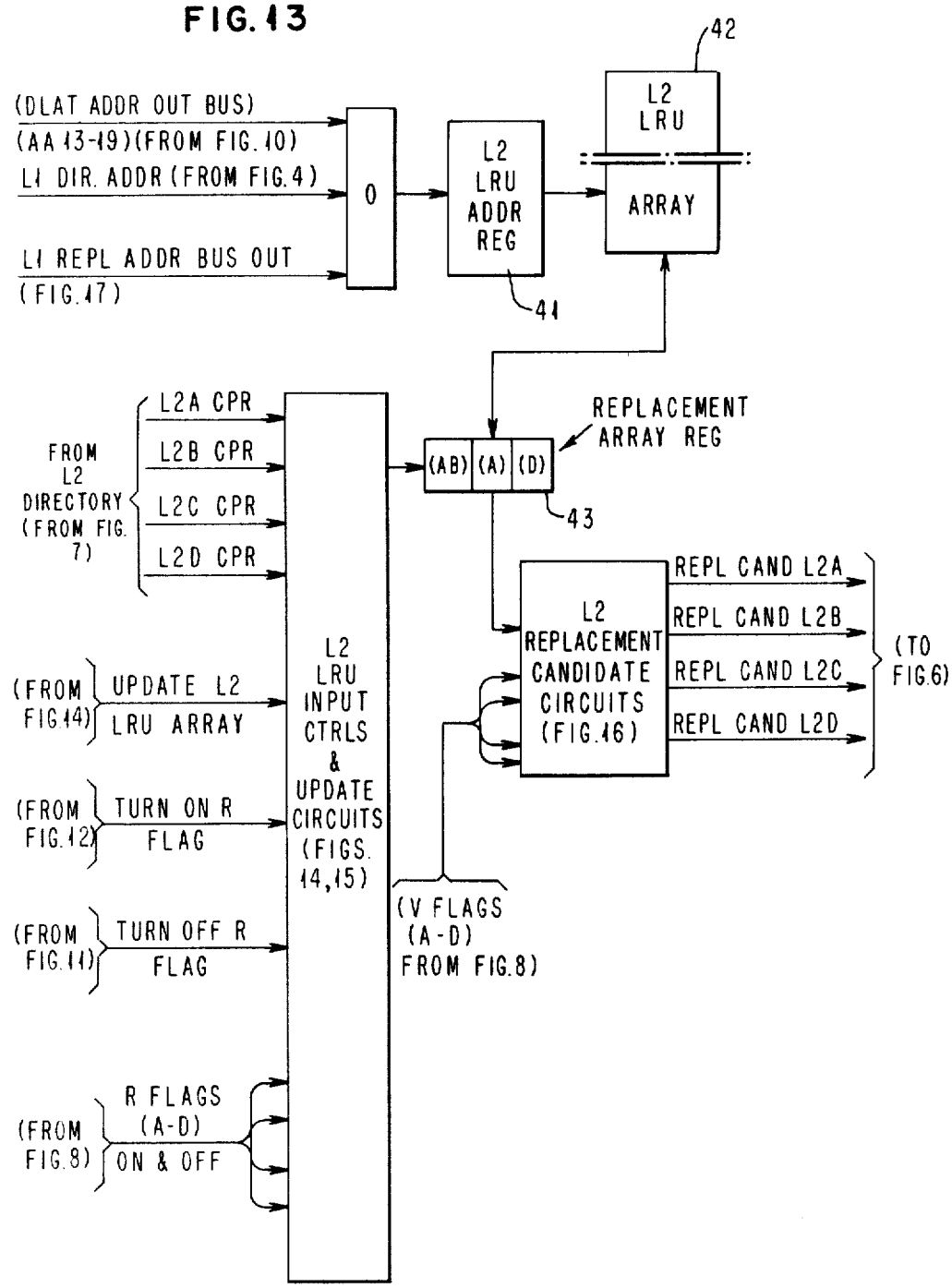
FIG. 13 illustrates L2 replacement candidate selection circuits.
Figure 14:
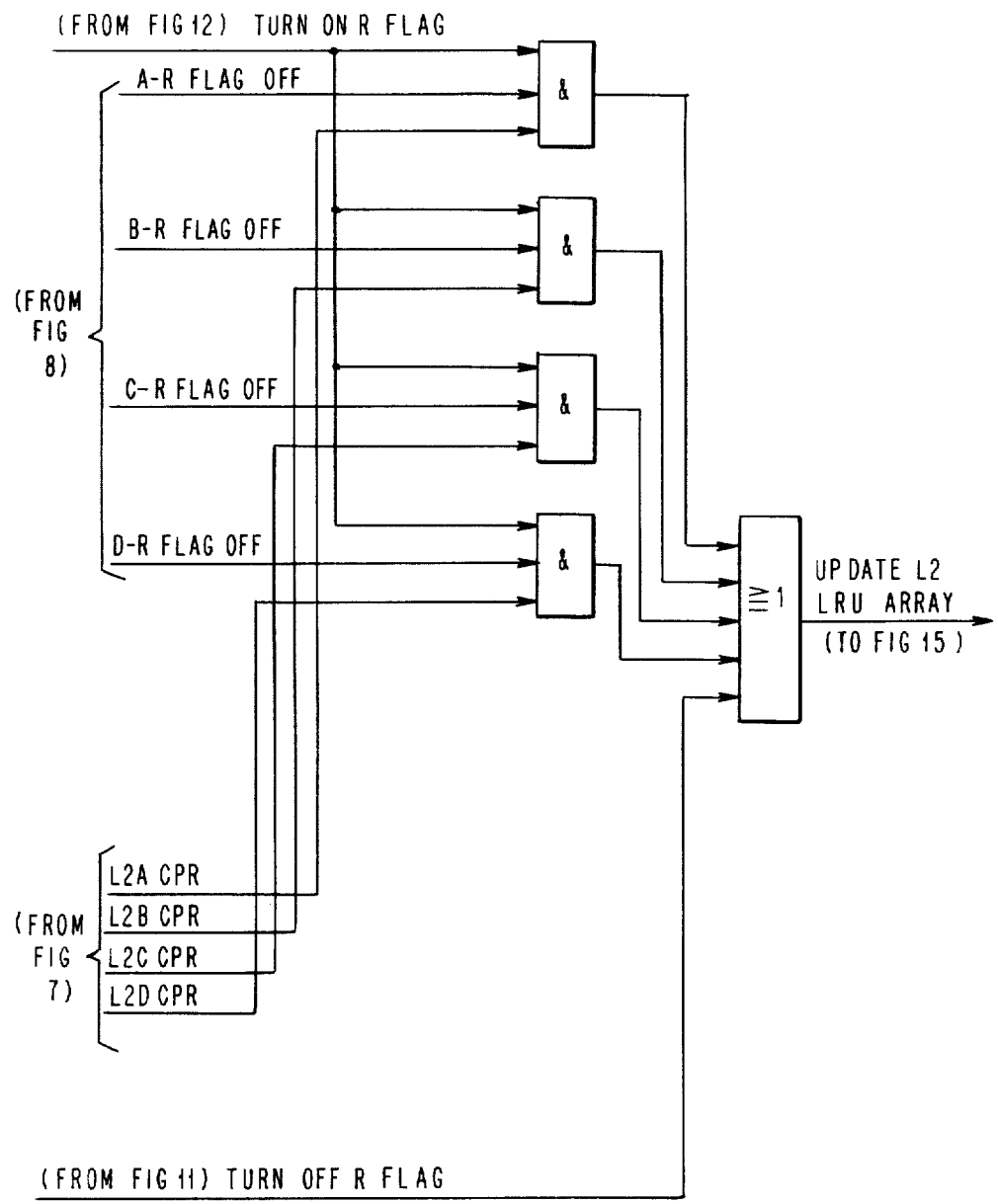
FIG. 14 illustrates detailed L2 LRU array input control circuits.
Figure 15:
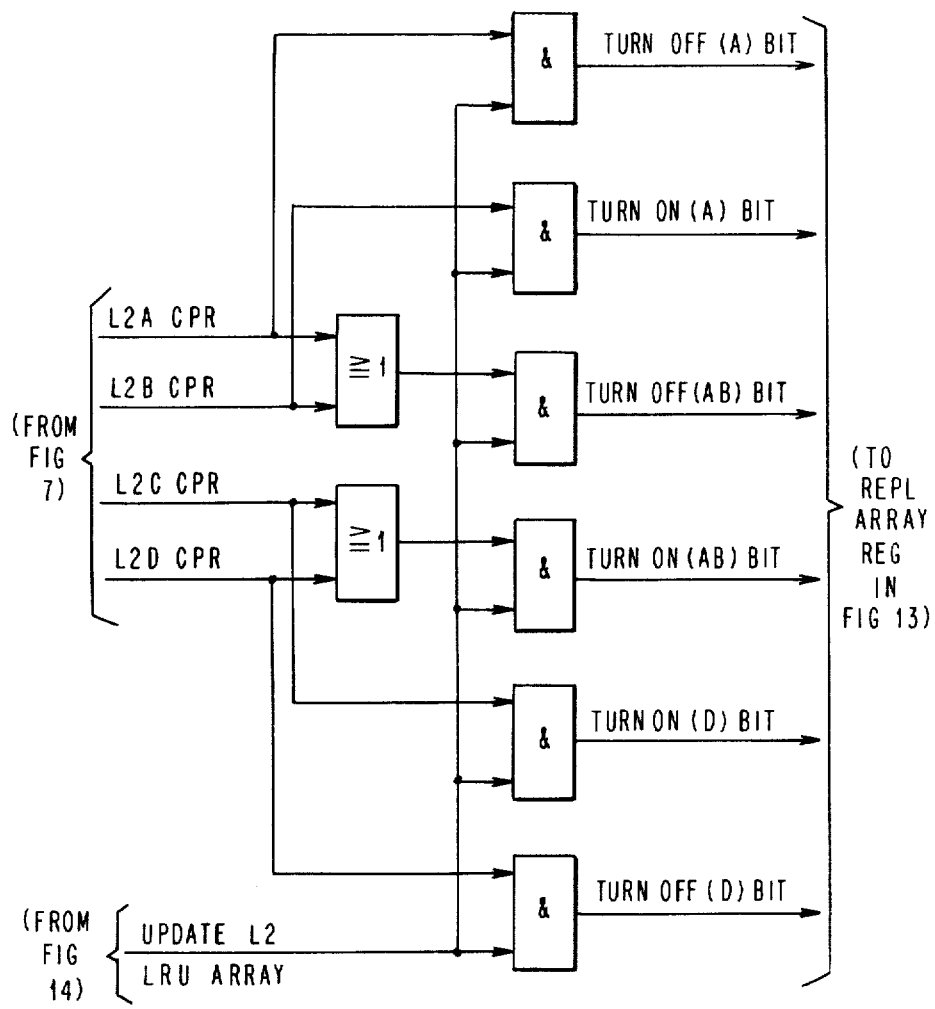
FIG. 15 illustrates in detail L2 LRU array update circuits.
Figure 16:
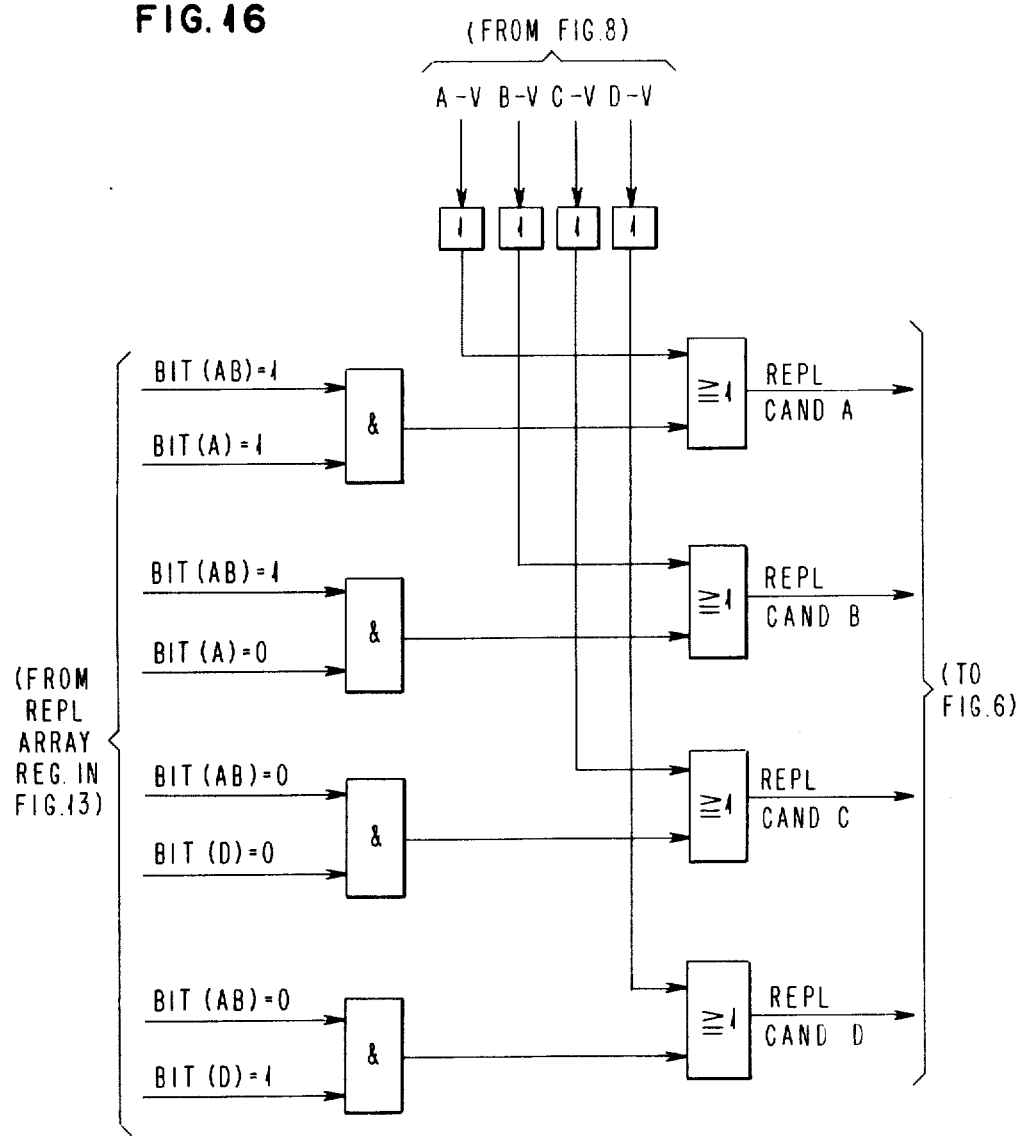
FIG. 16 illustrates in detail LRU replacement entry selection circuits.

FIG. 13 represents the L2 replacement candidate selection circuits and is inclusive of the circuits in FIGS. 14, 15 and 16. The L2 LRU address register 41 receives either the DLAT requested or replacement address from FIG. 10, the L1 directory address from FIG. 4, or the L1 replacement address from FIG. 17. This address in register 41 selects a row of three bits in the L2 LRU array 42 (which may be constructed in the same manner as the L1 LRU array or DLAT LRU array).

The LRU array, per se, operates in the manner of prior art LRU arrays found for example in prior IBM machines, and described in the previously cited Weinberger article published in 1971. An example of an L1 LRU array is disclosed in U.S. patent application Ser. No. 246,788; Filed: Mar. 23, 1981 entitled "Cache Locking Controls In A Multiprocessor" by S. K. Chan et al and assigned to the same assignee as the subject application. Each of the rows in the L2 and each other LRU array in this embodiment corresponds to a respective row in the respective cache (i.e. congruence class) having four entries, i.e. A, B, C and D. The setting of the three bits (AB), (A) and (D) in the selected LRU array row point to one of the four entries A, B, C, D in the respective cache or DLAT which is currently the most available candidate for being replaced in the selected congruence class. Only one LRU candidate in each class is pointed to by the LRU array. A valid replacement candidate remains useable until it is actually replaced. Any invalid entry in the class will be replaced before any valid entry that is indicated by the LRU pointer for the same congruence class.

The settings of the LRU bits (AB), (A), (D) in the replacement array 42 in FIG. 15 are determined by the accesses to the slots A, B, C and D in each congruence class, according to the following TABLE 2:

TABLE 2

| Slot Accessed | Turn On | Turn Off | Resultant (AB) | (A) | (D) | LRU Slot |
|---|---|---|---|---|---|---|
| A | None | (AB),(A) | 0 | 0 | X | C or D |
| B | (A) | (AB) | 0 | 1 | X | C or D |
| C | (AB),(D) | None | 1 | X | 1 | A or B |
| D | (AB) | (D) | 1 | X | 0 | A or B |

In TABLE 2, the resultant (AB), (A), (D), setting contains a value X which is not changed from the zero or one value it had before the respective slot access. Therefore, a total of eight different values may exist for (AB), (A), (D) which combinatorially represent the LRU slot in the respective congruence class, according to the following TABLE 3:

TABLE 3

| Settings | | | LRU |
|---|---|---|---|
| (AB) | (A) | (D) | |
| 0 | 0 | 0 | C |
| 0 | 0 | 1 | D |
| 0 | 1 | 0 | C |
| 0 | 1 | 1 | D |
| 1 | 0 | 0 | B |
| 1 | 0 | 1 | B |
| 1 | 1 | 0 | A |
| 1 | 1 | 1 | A |

The operation of TABLE 2 and TABLE 3 are old in the art, having been disclosed in the previously cited July 1971, IBM Technical Disclosure Bulletin article by Arnold Weinberger.

The selected row in array 42 is outputted into a replacement array register 43 in which the three row bits (AB), (A) and (D) may be updated by the circuits in FIG. 15 when the novel control provided by the circuits in FIG. 14 generate an update signal. When no update signal is generated by the FIG. 14 circuits, the readout row in register 43 is not changed.

Also, the readout array row in register 43 is used by the circuits in FIG. 16 when a L2 replacement candidate must be selected for the L2 cache. FIG. 16 represents conventional prior art circuits which receive the current content of the replacement array output register to select a replacement candidate from among the four entries in a currently selected class in the L2 cache.

This invention pertains to a novel method and means for setting the L2 replacement array to control the selection of the LRU candidate entry in each class in the L2 directory.

The novel circuits in FIG. 14 provide an update L2 LRU array signal whenever any R bit changes state, i.e. from off to on, or from on to off. The circuits in FIG. 14 do not provide any update signal whenever a turned on R bit again receives a turn on signal, which is a characteristic important to this invention in this embodiment, which will become apparent later. An update signal is provided whenever a turned off R bit again receives a turn off signal.

A L2 compare signal is provided to FIG. 14 and FIG. 15 from the L2 cache whenever the L1 address being provided from FIG. 10 on the DLAT address bus out compares-equal with the address contained in one of the entries in the selected class in the L2 directory to indicate that this L2 entry represents an L2 page being either hit or replaced by the DLAT, or by a real address made in the L1 cache, thereby causing the R flag for that L2 entry to be set either off or on.

The circuits in FIG. 15 use the update L2 LRU array signal to generate a three bit pointer for the L2 LRU array congruence class currently being selected in the L2 cache. The pointer selects a replacement candidate among the entries A, B, C, or D in the selected class.

The circuits in FIG. 15 are controlled in a very subtle manner by the update signal from FIG. 14 to cause the LRU array settings to operate in accordance with this invention. It is noted that the occurrence of the update signals to FIG. 15 is selective of which R bit switching signal is allowed to generate an update signal. In FIG. 14, the active one of the L2A, L2B, L2C, or L2D compare (CPR) inputs identifies which of the four entries is having its R flag state tested, i.e. either A, B, C or D, so that if the selected R flag is on, then no second turn on signal is permitted to generate an update signal to FIG. 15.

The effect of the operation by the circuits in FIGS. 14 and 15 is to set the current L2 class pointer (i.e. addressed row in the LRU array) to point away from any L2 entry having its R flag switched on or off (i.e. to point to a different L2 entry in the class than the selected entry). This prevents any entry having its R flag switched from being immediately made the LRU replacement candidate, and it cannot then be immediately replaced. Thus, an entry having its R flag switched on is not immediately made the LRU replacement candidate, and it cannot then be immediately replaced. However, any R flag which is in an on state will not again generate an update L2 LRU array signal until that R flag is set off. Therefore, if the R flag was correctly set on in the L2 cache, the correctness of the setting will be confirmed by a subsequent lack of activity, for this entry, which will age without activity and soon become the LRU replacement candidate; and it will get replaced instead of some other entry in its class.

The single turn-on characteristic of the circuit in FIG. 15 is particularly important in a multiprocessor system to prevent a second CPU from causing a second turn on signal to the LRU array for a R flag previously turned on by another CPU, because a second turn on signal to the LRU array would change the LRU status of the entry by having it age from the most recently turned on, rather than from its first turn on which should control its LRU status as a replacement candidate.

Any multiprogrammed system, whether in a uniprocessor or a multiprocessor, often causes a particular job to execute, get task switched out of the CPU, and shortly thereafter get task switched back into the CPU, etc. Task switching a job into and out of a CPU a number of times is a common situation. Each time the task is switched in or out of the CPU, lines of data get moved into the CPU L1 cache and the active page addresses are translated into the CPU DLAT. Each time the task gets switched out, these lines and page addresses quickly get replaced in the CPU's L1 cache and DLAT. If the pages are as quickly replaced in the L2 cache as their addresses are replaced and again put back into the DLAT, the next task switch for again executing the task would not find the page(s) in L2, and the CPU would need to get these page(s) from L3 (i.e. main storage), which will cause much inefficiency in the system and result in L2 not meeting its primary purpose of retaining pages which will get accessed in the near future. That is, if L2 were to replace its pages as fast as the DLAT replaces its page addresses (i.e. the DLAT page replacements to immediately force the corresponding L2 page replacements), then L2 may be a liability to the system by actually increasing the time loss for the L1 cache to get its requested lines after subsequent task switches. This task example analysis shows why the page replacement operation in L2 should respond at a much slower rate than the page address replacements in the DLAT or the line replacements in the L1 cache, in order to avoid ping-ponging pages between L2 and L3 to maximize the performance of the system.

The conclusion is that L2 must have a longer page replacement "time constant" than the DLAT to enable L2 to increase system performance.

The effect of having the FIG. 15 circuits immediately point away from an entry having its R flag switched on, results in causing the L2 replacement selection operation to have a longer "time constant" then the DLAT replacement selection operation, which is necessary for efficient L2 operation.

If another R flag is on in the selected class when a current R flag turn on occurs, the LRU pointer generated for that class will point away from the currently addressed entry, but may have the beneficial result of pointing at the other entry having the older turned on R flag, which then becomes the replacement candidate.

The effect of the R flag switch offs in FIG. 15 is to cause communicated DLAT hits to reset the LRU aging of the selected entry, which tends to prevent its selection as a replacement candidate. Hence, DLAT hits having L1 cache misses are immediately reflected into the L2 replacement candidacy of the L2 page entry having the CPU request. On the other hand, DLAT misses which turn on an R flag will operate the same as before.

Whenever all R flags are turned on in a congruence class, the LRU pointer selects the entry having the R flag on for the longest time.

Also, whenever all R flags are turned off in a congruence class, the LRU pointer still selects the LRU entry among the entries in the class, regardless of the off state of the R flags since the static states of the R flags are ignored by the LRU replacement selection circuits when generating an LRU pointer.

Although this invention has been shown and described with respect to plural embodiments thereof, it should be understood by those skilled in the art that various changes and omissions in the form and details of the invention may be made therein without departing from the spirit and the scope of the invention.

Having thus described my invention, what I claim as new and desire to secure by Letters Patent is:

1. A method for controlling data replacement in an intermediate cache in a storage hierarchy providing data from main storage (MS) for a CPU making all virtual storage requests to a dynamic look-aside translation buffer (DLAT) which contains translations of virtual page addresses to main storage page addresses, a CPU cache for receiving the CPU storage requests and having a CPU directory with entries for addressing subpage data units in the CPU cache, the intermediate cache having an intermediate directory with entries for addressing page data in the intermediate cache and transferring subpage data units to the CPU cache in response to a CPU cache miss of a CPU storage request, the DLAT generating a hit signal when the DLAT contains a CPU requested virtual address and its translated MS address, and the DLAT generating a miss signal when the DLAT does not contain the CPU requested virtual address; the DLAT, CPU cache and intermediate cache, each having a replacement selection means of the least recently used (LRU) type, the method comprising:

communicating DLAT replaced addresses to the replacement selection means for the intermediate cache and the intermediate directory, and controlling a reaction time for the replacement selection means of the intermediate cache to prevent an immediate replacement of an entry in the intermediate directory selected by the DLAT replaced address provided by the communicating step.

2. A method for controlling data replacement in an intermediate cache as defined in claim 1, the method further comprising:

the controlling step generating a LRU candidate pointer for a selected congruence class in the intermediate directory to point away from the entry selected by the DLAT replaced address provided by the communicating step.

3. A method for controlling data replacement in an intermediate cache as defined in claim 1, the method further comprising:
   also communicating to the intermediate directory a DLAT hit address having a miss in the CPU directory, and
   the controlling step also generating a LRU candidate pointer to a LRU entry in the selected congruence class in the replacement selection means for the intermediate directory to point away from the entry selected by the DLAT hit address provided by the communicating step.

4. A method for controlling data replacement in an intermediate cache as defined in claim 3, the method further characterized by:
   preventing the controlling step from generating a LRU candidate pointer when the communicating step makes a second communication of the DLAT replaced address without an intervening communication of a DLAT hit address to the same entry in the intermediate directory.

5. A method for controlling data replacement in an intermediate cache as defined in claim 3, the method further comprising:
   turning on a replacement flag with an entry in the intermediate directory selected by the DLAT replaced address, caused by a miss in the DLAT of a CPU storage request, and
   turning off a replacement flag with an entry in the intermediate directory selected by the DLAT hit address, caused by a DLAT hit.

6. A method for controlling data replacement in an intermediate cache as defined in claim 4, the method further characterized by:
   also turning off a replacement flag with an intermediate directory entry selected by a CPU request that bypasses the DLAT and has a miss in the CPU directory,
   also turning on a replacement flag with an intermediate directory entry selected by a replaced address in the CPU directory in response to a miss in the CPU directory by a CPU request that bypasses the DLAT.

7. A method for controlling data replacement in an intermediate cache as defined in claim 6, the method further comprising:
   operating a CPU with its dynamic address translation (DAT) set on to cause CPU requests to be translated by DAT with the translations set into DLAT, and testing the DAT setting when initiating the communicating step.

8. A method for controlling data replacement in an intermediate cache as defined in claim 6, the method further characterized by:
   operating a CPU with its dynamic address translation (DAT) set off to provide CPU requests that bypass the DLAT, and testing the DAT setting when initiating the communicating step.

9. In a storage hierarchy for a data processing system, containing at least one CPU having a first level (L1) cache with a L1 directory for receiving storage requests by the CPU and having a dynamic look-aside translator (DLAT) for receiving all virtual storage requests by the CPU, the L1 directory and the DLAT each having a least recently used (LRU) replacement selection means, the hierarchy having a main storage (MS), a second level in the hierarchy comprising:
   a second level (L2) cache for storing the same size storage unit that is addressed by the DLAT operating at the L1 level in the hierarchy,
   a second level (L2) directory having a plurality of entries respectively associated with different storage units in the L2 cache,
   a replacement flag being provided for each entry in the L2 cache directory, each replacement flag having a replacement candidate state or a non-replacement candidate state, the replacement state indicating an associated unit is a replacement candidate in the L2 cache and the non-replacement state indicating the associated unit is not a replacement candidate,
   first means for signalling to the L2 directory a storage address replaced in the DLAT, the DLAT replaced address selecting an entry in the L2 directory and setting the replacement flag for the selected entry to the replacement state,
   second means for signalling from the L1 level to the L2 directory a storage request address having a hit in the DLAT and a miss in the L1 cache, the storage request address selecting an entry in the L2 cache directory for setting the replacement flag for the selected entry to the non-replacement state.

10. In a storage hierarchy as defined in claim 9, further comprising:
    a L2 LRU replacement means being provided for the L2 directory to determine which entry is to be next replaced in a class when all entries in the class indicate valid data in the L2 cache,
    means for detecting a change of state of a replacement flag for a L2 entry currently being signalled by the first means or the second means,
    means for activating the L2 LRU replacement means to generate a LRU pointer to a replacement candidate entry in a selected class of entries when the detecting means signals the change of state, the LRU pointer pointing away from the entry having the change of state.

11. In a storage hierarchy as defined in claim 10, further comprising:
    means for inhibiting the L2 LRU replacement means from generating a LRU pointer for the selected class when the detecting means receives a signal from the first signalling means which does not change an existing replacement state of the entry.

12. In a storage hierarchy as defined in claim 11, further comprising:
    means for enabling the L2 LRU replacement means to generate a LRU pointer for the selected class when the detecting means receives a signal from the second signalling means which does not change an existing non-replacement state for the entry.

* * * * *